(12) United States Patent
Agarwal et al.

(10) Patent No.: US 7,428,497 B2
(45) Date of Patent: *Sep. 23, 2008

(54) METHODS AND APPARATUSES FOR PAY-PER-CALL ADVERTISING IN MOBILE/WIRELESS APPLICATIONS

(75) Inventors: Anuj Agarwal, San Francisco, CA (US); Nitin Ahuja, Redwood City, CA (US); Ebbe Altberg, Mill Valley, CA (US); Scott Faber, San Francisco, CA (US); Mark Arthur Buchler Halstead, Auckland (NZ); Sean Van der Linden, Berkeley, CA (US)

(73) Assignee: UTBK, Inc., Dover, DE (US)

( * ) Notice: Subject to any disclaimer, the term of this patent is extended or adjusted under 35 U.S.C. 154(b) by 170 days.

This patent is subject to a terminal disclaimer.

(21) Appl. No.: 11/077,655

(22) Filed: Mar. 10, 2005

(65) Prior Publication Data

US 2005/0216341 A1 Sep. 29, 2005

Related U.S. Application Data

(63) Continuation-in-part of application No. 11/021,939, filed on Dec. 23, 2004, and a continuation-in-part of application No. 11/014,073, filed on Dec. 15, 2004, which is a continuation-in-part of application No. 10/679,982, filed on Oct. 6, 2003, now Pat. No. 7,120,235.

(60) Provisional application No. 60/653,708, filed on Feb. 16, 2005, provisional application No. 60/568,156, filed on May 4, 2004, provisional application No. 60/560,926, filed on Apr. 9, 2004, provisional application No. 60/552,124, filed on Mar. 10, 2004.

(51) Int. Cl.
*G06Q 30/00* (2006.01)

(52) U.S. Cl. ............... 705/14; 379/112.01; 379/114.01; 379/114.05; 379/114.13

(58) Field of Classification Search .................. 705/14; 379/112.01, 114.01, 114.05, 114.13
See application file for complete search history.

(56) References Cited

U.S. PATENT DOCUMENTS 4,313,035 A 1/1982 Jordan et al.

(Continued)

FOREIGN PATENT DOCUMENTS

WO WO 98/47295 * 10/1998

(Continued)

OTHER PUBLICATIONS

Reding, Craig et al., U.S. Appl. No. 09/596,466 entitled "Methods and apparatus for providing telephone support for internet sales," filed Jun. 19, 2000.

(Continued)

*Primary Examiner*—Raquel Alvarez
(74) *Attorney, Agent, or Firm*—John P. Ward; Greenberg Traurig, LLP

(57) ABSTRACT

Methods and apparatuses to connect telephone calls and track information about the telephone calls resulting from advertisements on mobile/wireless media channels. In one embodiment, a method includes: assigning a telephone number to an advertiser, one of the telephone number and a reference to the telephone number to be included in an advertisement provided to an end user via a wireless media; and, monitoring telephone connections to the telephone number to bill the advertiser for the advertisement in response to each telephone connection to the telephone number. In one embodiment, a method includes: a first party providing an advertisement to a mobile device on behalf of an advertiser, the advertisement to include at least a reference to a telephonic connection with the advertiser; and, the first party collecting a fee from the advertiser in response to a telephonic connection being established between the advertiser and customer.

36 Claims, 20 Drawing Sheets

U.S. PATENT DOCUMENTS

| | | | |
|---|---|---|---|
| 4,577,065 A | 3/1986 | Frey et al. |
| 4,631,428 A | 12/1986 | Grimes |
| 4,645,873 A | 2/1987 | Chomet |
| 4,677,434 A | 6/1987 | Fascenda |
| 4,723,283 A | 2/1988 | Nagasawa et al. |
| 4,751,669 A | 6/1988 | Sturgis et al. |
| 4,752,675 A | 6/1988 | Zetmeir |
| 4,847,890 A | 7/1989 | Solomon et al. |
| 4,850,007 A | 7/1989 | Marino et al. |
| 4,963,995 A | 10/1990 | Lang |
| 5,057,932 A | 10/1991 | Lang |
| 5,058,152 A | 10/1991 | Solomom et al. |
| 5,148,474 A | 9/1992 | Haralambopoulos et al. |
| 5,155,743 A | 10/1992 | Jacobs |
| 5,164,839 A | 11/1992 | Lang |
| 5,262,875 A | 11/1993 | Mincer et al. |
| 5,319,542 A | 6/1994 | King, Jr. et al. |
| 5,325,424 A | 6/1994 | Grube |
| 5,347,632 A | 9/1994 | Filepp et al. |
| 5,359,508 A | 10/1994 | Rossides |
| 5,361,295 A | 11/1994 | Solomon et al. |
| 5,369,694 A | 11/1994 | Bales et al. |
| 5,440,334 A | 8/1995 | Walters et al. |
| 5,448,625 A | 9/1995 | Lederman |
| 5,453,352 A | 9/1995 | Tachibana |
| 5,497,502 A | 3/1996 | Castille |
| 5,524,146 A | 6/1996 | Morrisey et al. |
| 5,537,314 A | 7/1996 | Kanter |
| 5,539,735 A | 7/1996 | Moskowitz |
| 5,555,298 A | 9/1996 | Jonsson |
| 5,557,677 A | 9/1996 | Prytz |
| 5,574,780 A | 11/1996 | Andruska et al. |
| 5,574,781 A | 11/1996 | Blaze |
| 5,589,892 A | 12/1996 | Knee et al. |
| 5,590,197 A | 12/1996 | Chen et al. |
| 5,596,634 A | 1/1997 | Fernandez et al. |
| 5,602,905 A | 2/1997 | Mettke |
| 5,608,786 A | 3/1997 | Gordon |
| 5,615,213 A | 3/1997 | Griefer |
| 5,619,148 A | 4/1997 | Sloane |
| 5,619,570 A | 4/1997 | Tsutsui |
| 5,619,725 A | 4/1997 | Gordon |
| 5,619,991 A | 4/1997 | Sloane |
| 5,634,012 A | 5/1997 | Stefik et al. |
| 5,638,432 A | 6/1997 | Wille et al. |
| 5,675,734 A | 10/1997 | Hair |
| 5,694,549 A | 12/1997 | Carlin et al. |
| 5,701,419 A | 12/1997 | McConnell |
| 5,710,887 A | 1/1998 | Chelliah et al. |
| 5,710,970 A | 1/1998 | Walters et al. |
| 5,712,979 A | 1/1998 | Graber et al. |
| 5,715,314 A | 2/1998 | Payne et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,724,521 A | 3/1998 | Dedrick |
| 5,734,961 A | 3/1998 | Castille |
| 5,740,231 A | 4/1998 | Cohn et al. |
| 5,745,681 A | 4/1998 | Levine et al. |
| 5,751,956 A | 5/1998 | Kirsch |
| 5,768,348 A | 6/1998 | Solomon et al. |
| 5,768,521 A | 6/1998 | Dedrick |
| 5,774,534 A | 6/1998 | Mayer |
| 5,778,367 A | 7/1998 | Wesinger, Jr. et al. |
| 5,781,894 A | 7/1998 | Patrecca et al. |
| 5,794,221 A | 8/1998 | Egendorf |
| 5,802,502 A | 9/1998 | Gell et al. |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal |
| 5,819,092 A | 10/1998 | Ferguson et al. |
| 5,819,267 A | 10/1998 | Uyama |
| 5,819,271 A | 10/1998 | Mahoney et al. |
| 5,819,285 A | 10/1998 | Damico et al. |
| 5,825,869 A | 10/1998 | Brooks et al. |
| 5,825,876 A | 10/1998 | Peterson, Jr. |
| 5,832,523 A | 11/1998 | Kania et al. |
| 5,835,896 A | 11/1998 | Fisher et al. |
| 5,842,212 A | 11/1998 | Ballurio et al. |
| 5,850,433 A | 12/1998 | Rondeau |
| 5,860,068 A | 1/1999 | Cook |
| 5,862,223 A | 1/1999 | Walker et al. |
| 5,864,871 A | 1/1999 | Kitain et al. |
| RE36,111 E * | 2/1999 | Neville .................. 379/127.01 |
| 5,870,546 A | 2/1999 | Kirsch |
| 5,870,744 A | 2/1999 | Sprague |
| 5,878,130 A | 3/1999 | Andrews et al. |
| 5,884,032 A | 3/1999 | Bateman et al. |
| 5,884,272 A | 3/1999 | Walker et al. |
| 5,884,282 A | 3/1999 | Robinson |
| 5,889,774 A | 3/1999 | Mirashrafi et al. |
| 5,890,138 A | 3/1999 | Godin et al. |
| 5,893,077 A | 4/1999 | Griffin |
| 5,901,214 A | 5/1999 | Shaffer et al. |
| 5,903,635 A | 5/1999 | Kaplan |
| 5,907,077 A | 5/1999 | Glenn et al. |
| 5,907,677 A | 5/1999 | Glenn et al. |
| 5,911,132 A | 6/1999 | Sloane |
| 5,914,951 A | 6/1999 | Bentley et al. |
| 5,924,082 A | 7/1999 | Silverman et al. |
| 5,937,390 A | 8/1999 | Hyodo |
| 5,940,471 A | 8/1999 | Homayoun |
| 5,940,484 A | 8/1999 | DeFazio et al. |
| 5,946,646 A | 8/1999 | Schena et al. |
| 5,960,416 A | 9/1999 | Block |
| 5,963,202 A | 10/1999 | Polish |
| 5,963,861 A | 10/1999 | Hanson |
| 5,974,141 A | 10/1999 | Saito |
| 5,974,398 A | 10/1999 | Hanson et al. |
| 5,978,567 A | 11/1999 | Rebane et al. |
| 5,982,863 A | 11/1999 | Smiley et al. |
| 5,987,102 A | 11/1999 | Elliott et al. |
| 5,987,118 A | 11/1999 | Dickerman et al. |
| 5,987,430 A | 11/1999 | Van Horne et al. |
| 5,991,394 A | 11/1999 | Dezonno et al. |
| 5,995,705 A | 11/1999 | Lang |
| 5,999,609 A | 12/1999 | Nishimura |
| 5,999,611 A | 12/1999 | Tatchell et al. |
| 5,999,965 A | 12/1999 | Kelly |
| 6,006,197 A | 12/1999 | d-Eon et al. |
| 6,011,794 A | 1/2000 | Mordowitz et al. |
| 6,014,644 A | 1/2000 | Erickson |
| 6,026,087 A | 2/2000 | Mirashrafi et al. |
| 6,026,148 A | 2/2000 | Dworkin et al. |
| 6,026,375 A | 2/2000 | Hall et al. |
| 6,026,400 A | 2/2000 | Suzuki |
| 6,028,601 A | 2/2000 | Machiraju et al. |
| 6,029,141 A * | 2/2000 | Bezos et al. .................. 705/27 |
| 6,035,021 A | 3/2000 | Katz |
| 6,046,762 A | 4/2000 | Sonesh et al. |
| 6,055,513 A | 4/2000 | Katz et al. |
| 6,058,379 A | 5/2000 | Odom et al. |
| 6,064,978 A | 5/2000 | Gardener et al. |
| 6,108,704 A | 8/2000 | Hutton et al. |
| 6,130,933 A | 10/2000 | Miloslavsky |
| 6,144,670 A | 11/2000 | Sponaugle et al. |
| 6,167,449 A | 12/2000 | Arnold et al. |
| 6,173,279 B1 | 1/2001 | Levin et al. |
| 6,175,619 B1 | 1/2001 | DeSimone |
| 6,185,194 B1 | 2/2001 | Musk et al. |
| 6,188,673 B1 | 2/2001 | Bauer et al. |

| | | |
|---|---|---|
| 6,188,761 B1 | 2/2001 | Dickerman et al. |
| 6,189,030 B1 | 2/2001 | Kirsch et al. |
| 6,192,050 B1 | 2/2001 | Stovall |
| 6,199,096 B1 | 3/2001 | Mirashrafi et al. |
| 6,208,713 B1 | 3/2001 | Rahrer et al. |
| 6,212,192 B1 | 4/2001 | Mirashrafi et al. |
| 6,216,111 B1 | 4/2001 | Walker et al. |
| 6,223,165 B1 | 4/2001 | Lauffer |
| 6,230,287 B1 | 5/2001 | Pinard et al. |
| 6,243,684 B1 | 6/2001 | Stuart et al. |
| 6,259,774 B1 | 7/2001 | Miloslavsky |
| 6,269,336 B1 | 7/2001 | Ladd et al. |
| 6,269,361 B1 | 7/2001 | Davis et al. |
| 6,275,490 B1 | 8/2001 | Mattaway et al. |
| 6,292,799 B1 | 9/2001 | Peek et al. |
| 6,298,056 B1 | 10/2001 | Pendse |
| 6,301,342 B1 | 10/2001 | Ander et al. |
| 6,304,637 B1 | 10/2001 | Mirashrafi et al. |
| 6,310,941 B1 | 10/2001 | Crutcher et al. |
| 6,314,402 B1 | 11/2001 | Monaco et al. |
| 6,323,894 B1 | 11/2001 | Katz |
| 6,327,572 B1 | 12/2001 | Morton et al. |
| 6,385,583 B1 | 5/2002 | Ladd et al. |
| 6,393,117 B1 | 5/2002 | Trell |
| 6,400,806 B1 | 6/2002 | Uppaluru |
| 6,404,864 B1 | 6/2002 | Evslin et al. |
| 6,404,877 B1 | 6/2002 | Bolduc et al. |
| 6,404,884 B1 | 6/2002 | Marwell et al. |
| 6,408,278 B1 | 6/2002 | Carney et al. |
| 6,430,276 B1 | 8/2002 | Bouvier et al. |
| 6,434,527 B1 | 8/2002 | Horvitz |
| 6,463,136 B1 | 10/2002 | Malik |
| 6,466,966 B1 | 10/2002 | Kirsch et al. |
| 6,470,079 B1 | 10/2002 | Benson |
| 6,470,181 B1 | 10/2002 | Maxwell |
| 6,470,317 B1 | 10/2002 | Ladd et al. |
| 6,484,148 B1 | 11/2002 | Boyd |
| 6,493,437 B1 | 12/2002 | Olshansky |
| 6,493,671 B1 | 12/2002 | Ladd et al. |
| 6,493,673 B1 | 12/2002 | Ladd et al. |
| 6,510,417 B1 | 1/2003 | Woods et al. |
| 6,523,010 B2 | 2/2003 | Lauffer |
| 6,523,101 B1 | 2/2003 | Lauffer |
| 6,529,878 B2 | 3/2003 | De Rafael et al. |
| 6,539,359 B1 | 3/2003 | Ladd et al. |
| 6,546,372 B2 | 4/2003 | Lauffer |
| 6,549,889 B2 | 4/2003 | Lauffer |
| 6,560,576 B1 | 5/2003 | Cohen et al. |
| 6,606,376 B1 | 8/2003 | Trell |
| 6,625,595 B1 | 9/2003 | Anderson et al. |
| 6,636,590 B1 | 10/2003 | Jacob et al. |
| 6,658,389 B1 | 12/2003 | Alpdemir |
| 6,757,364 B2 | 6/2004 | Newkirk |
| 6,769,020 B2 * | 7/2004 | Miyazaki et al. ............ 709/219 |
| 6,807,532 B1 | 10/2004 | Kolls |
| 6,813,346 B2 | 11/2004 | Gruchala et al. |
| 6,836,225 B2 | 12/2004 | Lee et al. |
| 6,847,992 B1 * | 1/2005 | Haitsuka et al. ............ 709/218 |
| 6,850,965 B2 | 2/2005 | Allen |
| 6,859,833 B2 | 2/2005 | Kirsch et al. |
| 6,968,174 B1 | 11/2005 | Trandal et al. |
| 7,028,012 B2 | 4/2006 | St. Vrain |
| 7,035,381 B2 | 4/2006 | D'Ascenzo et al. |
| 7,076,037 B1 | 7/2006 | Gonen et al. |
| 7,092,901 B2 * | 8/2006 | Davis et al. .................. 705/26 |
| 7,200,413 B2 | 4/2007 | Montemer |
| 7,212,615 B2 | 5/2007 | Wolmuth |
| 7,224,781 B2 | 5/2007 | Jacob et al. |
| 7,231,405 B2 | 6/2007 | Xia |
| 2001/0010043 A1 | 7/2001 | Lauffer |
| 2001/0012913 A1 | 8/2001 | Iliff |
| 2001/0016826 A1 | 8/2001 | Lauffer |
| 2001/0018662 A1 | 8/2001 | Lauffer |
| 2001/0027481 A1 | 10/2001 | Whyel |
| 2001/0029322 A1 | 10/2001 | Iliff |
| 2001/0032247 A1 | 10/2001 | Kanaya |
| 2001/0036822 A1 | 11/2001 | Mead et al. |
| 2001/0037283 A1 | 11/2001 | Mullaney |
| 2001/0048737 A1 | 12/2001 | Goldberg et al. |
| 2002/0003867 A1 | 1/2002 | Rothschild et al. |
| 2002/0010608 A1 | 1/2002 | Faber et al. |
| 2002/0010616 A1 | 1/2002 | Itzhaki |
| 2002/0026457 A1 | 2/2002 | Jensen |
| 2002/0029241 A1 | 3/2002 | Yokono et al. |
| 2002/0038233 A1 | 3/2002 | Shubov et al. |
| 2002/0044640 A1 | 4/2002 | Meek et al. |
| 2002/0057776 A1 | 5/2002 | Dyer |
| 2002/0065959 A1 | 5/2002 | Kim et al. |
| 2002/0087565 A1 | 7/2002 | Hoekman et al. |
| 2002/0090203 A1 | 7/2002 | Mankovitz |
| 2002/0095331 A1 | 7/2002 | Osmar et al. |
| 2002/0107697 A1 | 8/2002 | Jensen |
| 2002/0107805 A1 | 8/2002 | Kamimura et al. |
| 2002/0120554 A1 | 8/2002 | Vega |
| 2002/0122547 A1 | 9/2002 | Hinchey et al. |
| 2002/0133388 A1 | 9/2002 | Lauffer |
| 2002/0133402 A1 | 9/2002 | Faber et al. |
| 2002/0133570 A1 | 9/2002 | Jacob et al. |
| 2002/0133571 A1 | 9/2002 | Jacob et al. |
| 2002/0173319 A1 | 11/2002 | Fostick |
| 2002/0191762 A1 | 12/2002 | Benson |
| 2002/0193094 A1 | 12/2002 | Lawless et al. |
| 2003/0026397 A1 | 2/2003 | McCroskey |
| 2003/0036686 A1 | 2/2003 | Iliff |
| 2003/0043981 A1 | 3/2003 | Lurie et al. |
| 2003/0046161 A1 | 3/2003 | Kamanger et al. |
| 2003/0046361 A1 | 3/2003 | Kirsch et al. |
| 2003/0083042 A1 | 5/2003 | Abuhamdeh |
| 2003/0105824 A1 | 6/2003 | Brechner et al. |
| 2003/0135095 A1 | 7/2003 | Iliff |
| 2003/0138091 A1 | 7/2003 | Meek et al. |
| 2003/0153819 A1 | 8/2003 | Iliff |
| 2003/0163299 A1 | 8/2003 | Iliff |
| 2003/0195787 A1 | 10/2003 | Brunk et al. |
| 2003/0212600 A1 | 11/2003 | Hood et al. |
| 2003/0220866 A1 | 11/2003 | Pisaris-Henderson |
| 2003/0223563 A1 | 12/2003 | Wolmuth |
| 2003/0223565 A1 | 12/2003 | Montemer |
| 2003/0225682 A1 | 12/2003 | Montemer |
| 2003/0231754 A1 | 12/2003 | Stein et al. |
| 2004/0003041 A1 | 1/2004 | Moore et al. |
| 2004/0006511 A1 | 1/2004 | Montemer |
| 2004/0008834 A1 | 1/2004 | Bookstaff |
| 2004/0010518 A1 | 1/2004 | Montemer |
| 2004/0023644 A1 | 2/2004 | Montemer |
| 2004/0076403 A1 | 4/2004 | Mankovitz |
| 2004/0083133 A1 | 4/2004 | Nicholas et al. |
| 2004/0091093 A1 | 5/2004 | Bookstaff |
| 2004/0096110 A1 | 5/2004 | Yogeshwar et al. |
| 2004/0162757 A1 | 8/2004 | Pisaris-Henderson |
| 2004/0174965 A1 | 9/2004 | Brahm et al. |
| 2004/0174974 A1 | 9/2004 | Meek et al. |
| 2004/0193488 A1 | 9/2004 | Khoo et al. |
| 2004/0204997 A1 | 10/2004 | Blaser et al. |
| 2004/0234049 A1 | 11/2004 | Melideo |
| 2004/0234064 A1 | 11/2004 | Melideo |
| 2004/0235524 A1 | 11/2004 | Abuhamdeh |
| 2004/0236441 A1 | 11/2004 | Melideo |
| 2004/0247092 A1 | 12/2004 | Timmins et al. |
| 2004/0249649 A1 | 12/2004 | Stratton et al. |
| 2004/0249778 A1 | 12/2004 | Iliff |
| 2004/0254859 A1 | 12/2004 | Aslanian, Jr. |
| 2004/0258048 A1 | 12/2004 | Melideo |
| 2004/0260413 A1 | 12/2004 | Melideo |
| 2005/0010795 A1 | 1/2005 | Tagawa et al. |
| 2005/0018829 A1 | 1/2005 | Baker |

| | | |
|---|---|---|
| 2005/0021744 A1 | 1/2005 | Haitsuka et al. |
| 2005/0038686 A1 | 2/2005 | Lauffer |
| 2005/0041647 A1 | 2/2005 | Stinnie |
| 2005/0044238 A1 | 2/2005 | Jacob et al. |
| 2005/0048961 A1 | 3/2005 | Ribaudo et al. |
| 2005/0065811 A1 | 3/2005 | Chu et al. |
| 2005/0074100 A1 | 4/2005 | Lederman |
| 2005/0074102 A1 | 4/2005 | Altberg et al. |
| 2005/0076100 A1 | 4/2005 | Armstrong |
| 2005/0080878 A1 | 4/2005 | Cunningham et al. |
| 2005/0086104 A1 | 4/2005 | McFadden |
| 2005/0100153 A1 | 5/2005 | Pines et al. |
| 2005/0105881 A1 | 5/2005 | Mankovitz |
| 2005/0114210 A1 | 5/2005 | Faber et al. |
| 2005/0125416 A1 | 6/2005 | Kirsch et al. |
| 2005/0135387 A1 | 6/2005 | Rychener et al. |
| 2005/0154616 A1 | 7/2005 | Iliff |
| 2005/0165285 A1 | 7/2005 | Iliff |
| 2005/0165666 A1 | 7/2005 | Wong et al. |
| 2005/0203799 A1 | 9/2005 | Faber et al. |
| 2005/0209874 A1 | 9/2005 | Rossini |
| 2005/0216341 A1 | 9/2005 | Agarwal et al. |
| 2005/0216345 A1 | 9/2005 | Altberg et al. |
| 2005/0220289 A1 | 10/2005 | Reding |
| 2005/0222908 A1 | 10/2005 | Altberg et al. |
| 2005/0240432 A1 | 10/2005 | Jensen |
| 2005/0245241 A1 | 11/2005 | Durand et al. |
| 2005/0251445 A1 | 11/2005 | Wong et al. |
| 2005/0261964 A1 | 11/2005 | Fang |
| 2005/0286688 A1 | 12/2005 | Scherer |
| 2005/0289015 A1 | 12/2005 | Hunter et al. |
| 2006/0003735 A1 | 1/2006 | Trandal et al. |
| 2006/0004627 A1 | 1/2006 | Baluja |
| 2006/0095343 A1 | 5/2006 | Clarke et al. |
| 2006/0106711 A1 | 5/2006 | Melideo |
| 2006/0159063 A1 | 7/2006 | Kumer |
| 2006/0166655 A1 | 7/2006 | Montemer |
| 2006/0171520 A1 | 8/2006 | Kliger |
| 2006/0173287 A1 | 8/2006 | Kliger |
| 2006/0173915 A1 | 8/2006 | Kliger |
| 2006/0182250 A1 | 8/2006 | Melideo |
| 2006/0184417 A1 | 8/2006 | Van der Linden et al. |
| 2006/0200380 A1 | 9/2006 | Ho et al. |
| 2006/0259365 A1 | 11/2006 | Agarwal et al. |
| 2006/0277108 A1 | 12/2006 | Altberg et al. |
| 2007/0011240 A1 | 1/2007 | Altberg et al. |
| 2007/0022011 A1 | 1/2007 | Altberg et al. |
| 2007/0038507 A1 | 2/2007 | Kumer |
| 2007/0067219 A1 | 3/2007 | Altberg et al. |
| 2007/0078717 A1 | 4/2007 | Ho et al. |
| 2007/0081662 A1 | 4/2007 | Altberg et al. |
| 2007/0083408 A1 | 4/2007 | Altberg et al. |
| 2007/0100956 A1 | 5/2007 | Kumer |
| 2007/0116217 A1 | 5/2007 | Altberg et al. |
| 2007/0121844 A1 | 5/2007 | Altberg et al. |
| 2007/0121845 A1 | 5/2007 | Altberg et al. |
| 2007/0121846 A1 | 5/2007 | Altberg et al. |
| 2007/0121847 A1 | 5/2007 | Faber et al. |
| 2007/0121848 A1 | 5/2007 | Faber et al. |
| 2007/0124206 A1 | 5/2007 | Faber et al. |
| 2007/0124207 A1 | 5/2007 | Faber et al. |
| 2007/0127650 A1 | 6/2007 | Altberg et al. |
| 2007/0129054 A1 | 6/2007 | Andronikov et al. |
| 2007/0130014 A1 | 6/2007 | Altberg et al. |
| 2007/0140451 A1 | 6/2007 | Altberg et al. |
| 2007/0143182 A1 | 6/2007 | Faber et al. |

FOREIGN PATENT DOCUMENTS

| | | |
|---|---|---|
| WO | 9955066 | 10/1999 |
| WO | 0244870 A2 | 6/2002 |
| WO | 2005040962 | 5/2005 |
| WO | 2005086980 | 9/2005 |
| WO | 2005101269 | 10/2005 |
| WO | 2005109288 | 11/2005 |
| WO | 2005111887 | 11/2005 |
| WO | 2005111893 | 11/2005 |
| WO | 2006091966 | 8/2006 |
| WO | 2006091970 | 8/2006 |
| WO | 2007028173 | 3/2007 |
| WO | 2007038618 | 4/2007 |

OTHER PUBLICATIONS

Rothschild, Peter et al., U.S. Appl. No. 60/198,642 entitled "Systems and methods for connecting customers to merchants over a voice communication network," filed Apr. 20, 2000.

Melideo, John, U.S. Appl. No. 60/471,535 entitled "HyperDial," filed May 19, 2003.

ADS-Click, "ADS-click Adds Skype-Based Pay-Per-Call Advertising Capabilities to Its Private-Labeled Solution, Which Will Be Unveiled at ad:tech New York," Market Wire, Oct. 10, 2005.

Greenberg, Ken, "Jambo Launches to Connect People and Businesses from the Internet to the Phone," Market Wire, May 3, 2005.

Greenberg, Ken, "Jambo Names Netzero Co-founder Stacy Haitsuka to New Post of Chief Information Officer," Business Wire, Jul. 5, 2005.

Greenberg, Ken, "Jambo Receives $5 Million in Financing from Kline Hawkes & Co., Westlake Venture Partners, Others," Business Wire, Oct. 17, 2005.

Jambo, "Welcome to Jambo—The Leader in Pay-Per-Call Solutions," company information retrieved from http://www.jambo.com, available at least by Oct. 17, 2005.

Jingle Networks, Inc., "1-800-FREE411 Provides Two Great Opportunities to Acquire New Customers," available at least by Oct. 20, 2005.

Jingle Networks, Inc., "Introducing 1-800 FREE411: First Nationwide Free Telephone Directory Assistance Service," Sep. 20, 2005.

Patricia Hursh, "Search Advertising that Makes the Phone Ring", Search Engine Watch, Apr. 19, 2005.

Sean Bolton, "Pay-Per-Call Frenzy", Sep. 14, 2005.

Brian Quinton, "Pay-per-Call Picks Up Speed", Oct. 1, 2005.

Peggy Anne Salz, "Pay-Per-Call Mobile Search Model Gains Traction as 'Last Mile' to Mobile Content", Dec. 11, 2006.

Ingenio, Inc., "FindWhat.com Enters Agreement with Ingenio to Offer Pay Per Call Advertising Platform," press release available at http://www.ingenio.com, Apr. 7, 2004.

"AtOnce Talks Up E-mail Marketing Campaigns with ITXC Push to Talk Service," Business Wire, Feb. 26, 2001.

"ITXC Corp and Doubleclick Energize Banner Ads with Web Telephony; Companies Voice-Enable Banner Advertisements Using ITXC Push to Talk Service," Business Wire, Dec. 12, 2000.

ISA/US, International Search Report for International Application No. PCT/US05/12061, 3 pages, Nov. 17, 2006.

* cited by examiner

CALL HANDLING MODULE
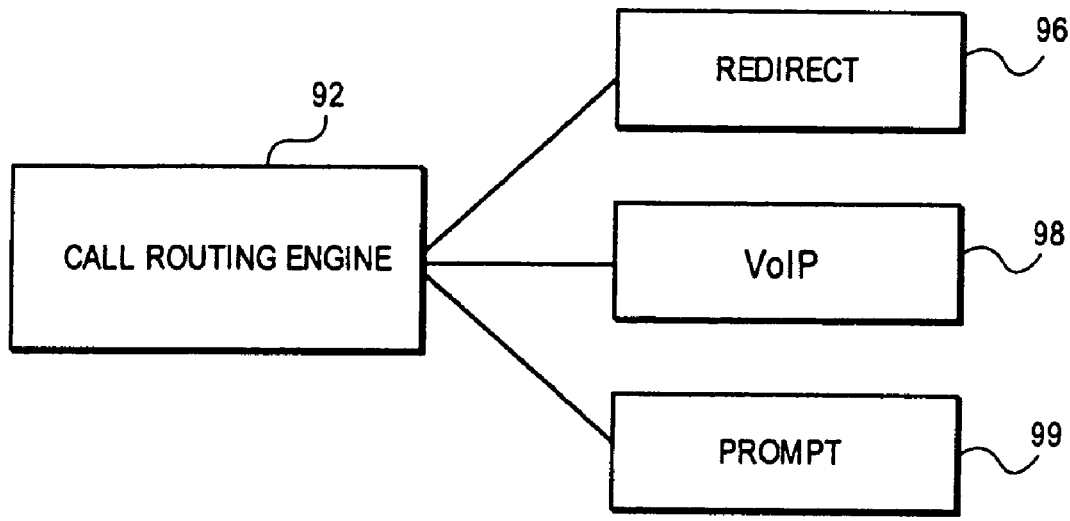
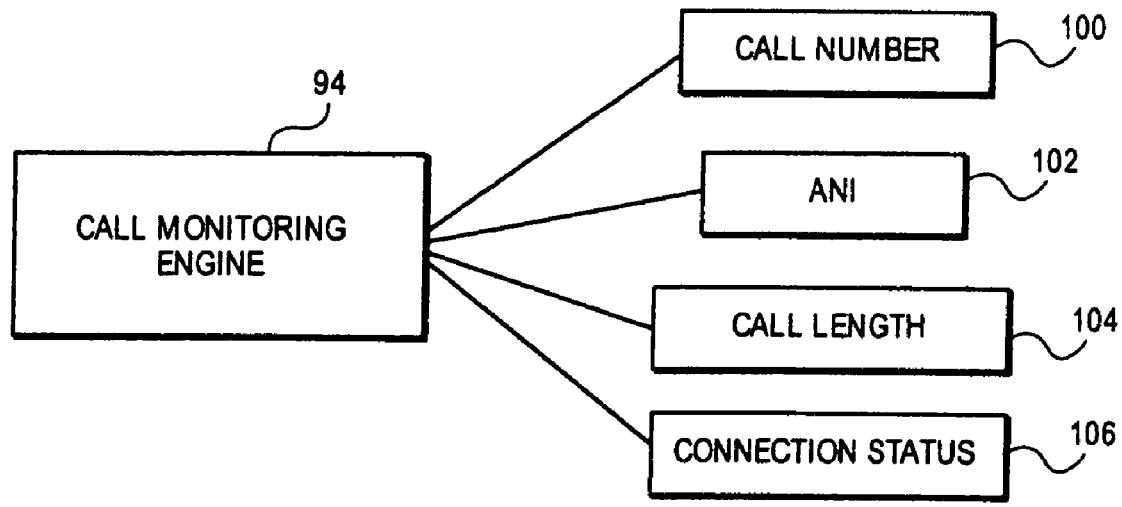
FIG. 7

← 114

SCROLL DOWN to see more listings        Refine your search by Zip Code:

Your search found 105 listings, Listings 1 to 15 listed below...

Thinking of buying a new car?
Fill out IMotors' simple online form and receive a free new car quote from a local dealer by email within 24 hours. There is no obligation and no hassle. Serious buyers only please.

FEATURED DIRECTORY LISTINGS                    SCROLL DOWN for more listings
                                                    City Gold

  Dream Car Rentals
3734 Las Vegas Blvd.
LAS VEGAS, NV
Phone: (702)555-6661
Fax: (702) 555-6665

We Specialize in Excitement! Ferrari's, Viper's Porsche's &
Hummers. Harley-Davidson's and SUV's. "DRIVE THE DREAM"

City Gold

RENT-A-VETTE
5021 SWENSON STREET
LAS VEGAS, NV 89119
Phone: (702) 555-2692
Fax: (702) 555-2044

ONLINE LISTINGS                                SCROLL DOWN for more listings Expedia: For All Your Car Rental Needs  http://www.expedia.com
Save with Expedia.com, your one-stop source for flights, hotels, vacation packages, cruises, and rental

FIG. 9

METHODS AND APPARATUSES FOR PAY-PER-CALL ADVERTISING IN MOBILE/WIRELESS APPLICATIONS

The present patent application is a continuation in part application of copending U.S. patent application Ser. No. 11/014,073, filed Dec. 15, 2004 and U.S. patent application Ser. No. 11/021,939, filed Dec. 23, 2004, which is a continuation in part application of U.S. patent application Ser. No. 10/679,982, filed Oct. 6, 2003, now U.S. Pat. No. 7,120,235. The present patent application claims priority from Provisional U.S. Patent Application Ser. No. 60/568,156, filed on May 4, 2004, Provisional U.S. Patent Application Ser. No. 60/560,926, filed on Apr. 9, 2004, Provisional U.S. Patent Application Ser. No. 60/552,124, filed on Mar. 10, 2004, and Provisional U.S. Patent Application 60/653,708, filed on Feb. 16, 2005 and entitled "Methods and Apparatuses for Pay-Per-Call Advertising in Mobile/Wireless Applications". All the above-mentioned parent applications are incorporated herein by reference.

TECHNOLOGY FIELD

At least some embodiments of the present invention relate to telephonic connections and advertising in general and performance-based advertising in mobile/wireless applications in particular.

BACKGROUND

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a package switched network for a telephone connection. A package switched network is typical in a computer data environment. Recent developments in the field of Voice over IP (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a consumer. For example, paid inclusion advertising is a form of performance-based search advertising. With paid inclusion advertising, an advertisement is included within a search result page of a key word search. Each selection ("click") of the advertisement from the results page is the measurable event for which the advertiser pays. In other words, payment by the advertiser is on a per click basis.

Another form of performance-based advertising includes paid placement advertising. Paid placement advertising is similar to paid inclusion advertising in that payment is on a per click basis. However, with paid placement advertising an advertiser ranks a particular advertisement so that it appears or is placed at a particular spot, e.g., at the top of a search engine result page, thereby to increase the odds of the advertisement being selected.

Both forms of performance-based advertising, i.e., paid placement and paid inclusion, suffer from the limitation that an advertiser or participant within a paid placement or paid inclusion advertising program is required to have a web presence, in the form of a web page. However, there are advertisers that either (a) do not have web pages, or (b) have web pages that are not effective at capturing the value of a web visitor, and are therefore unable, or unwilling, to participate in the traditional performance-based advertising, as described above.

SUMMARY

Methods and apparatuses to connect telephone calls and track information about the telephone calls resulting from advertisements on mobile/wireless media channels are described here. In one embodiment, a method includes: assigning a telephone number to an advertiser, one of the telephone number and a reference to the telephone number to be included in an advertisement provided to an end user via a wireless media; and, monitoring telephone connections to the telephone number to bill the advertiser for the advertisement in response to each telephone connection to the telephone number. In one embodiment, a method includes: a first party providing an advertisement to a mobile device on behalf of an advertiser, the advertisement to include at least a reference to a telephonic connection with the advertiser; and, the first party collecting a fee from the advertiser in response to a telephonic connection being established between the advertiser and customer.

BRIEF DESCRIPTION OF THE DRAWINGS

FIG. 7 illustrates the Call Handling Module of the system, in greater detail;

FIG. 9 shows an example of a search engine result page, which includes an advertisement generated, in accordance with one embodiment of the present invention;

DETAILED DESCRIPTION

In the following description, for purposes of explanation, numerous specific details are set forth in order to provide a thorough understanding of the description. It will be apparent, however, to one skilled in the art that the invention can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
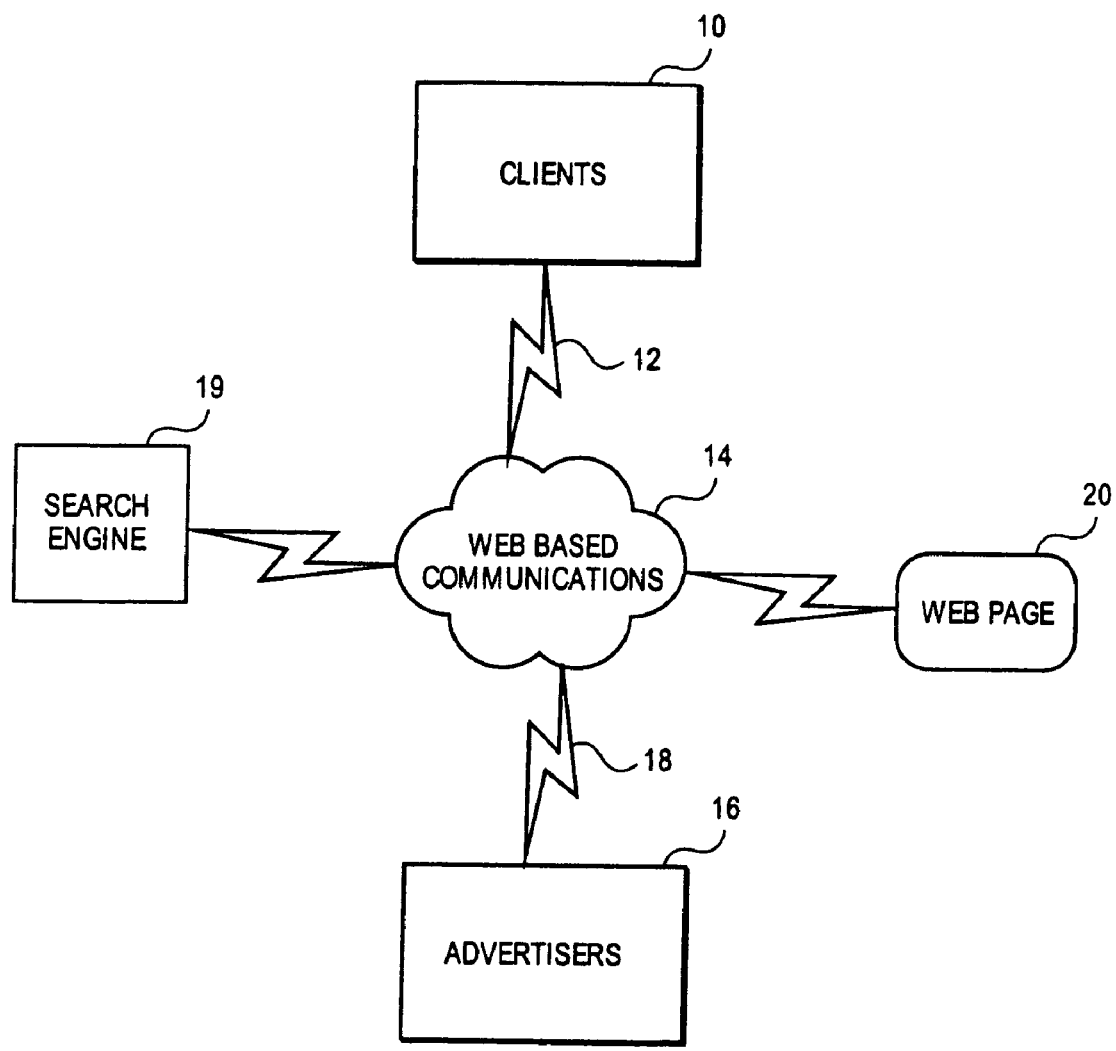
FIG. 1 shows how clients and advertisers interact with each other using a paid placement, or a paid inclusion advertising model, in accordance with the prior art.

FIG. 1 of the drawings illustrates how clients and advertisers interact with each other in accordance with the paid placement, and paid inclusion advertising models of the prior art. Referring to FIG. 1, a number of clients indicated by reference numeral 10 are coupled to a wide area network (WAN) 14, such as the Internet via a communications path 12. Advertisers 16 are coupled to the WAN 14 via a communications path 18. The communications paths 12 and 18 may support the TCP/IP protocols, in one embodiment. Each advertiser 16 has a web page 20 which in accordance with the paid placement, and paid inclusion advertising models described above, may be included in a results page of a key word search initiated by a user of a client 10, which search is performed by an online search engine 19. Based on the paid placement, or the paid inclusion models, the web page 20 of an advertiser 16 is included within a results page compiled by the search engine 19 and sent via the communications path 12 to the client 10 that initiated the search, so that the web page 20 may be selected or viewed by a user of the client 10 that requested the search. As noted above, if an advertiser 16 does not have a web page 20, or does not have a web page 20 that is effective at capturing the value of a web visitor, then currently, such an advertiser may not participate, or effectively participate, in performance-based marketing such as paid placement, and paid inclusion programs.

Figure 2:
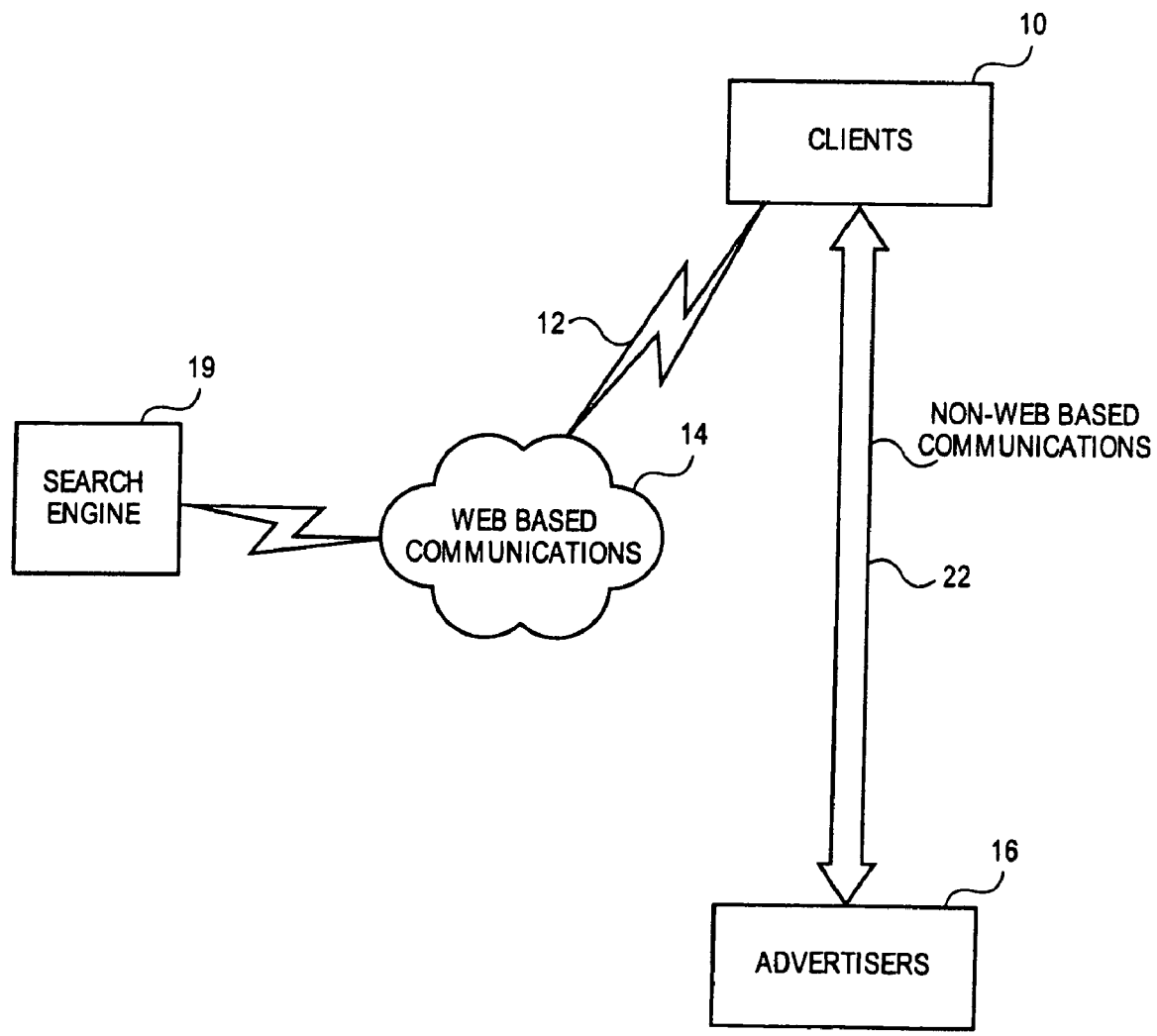
FIG. 2 shows an interaction between clients and advertisers, in accordance with one embodiment of the present invention.

Referring now to FIG. 2 of the drawings, a method for allowing advertisers to participate in a pay per call advertising program, without requiring that the advertisers have a web presence, in accordance with one embodiment, is illustrated. As will be seen, the clients 10 are coupled to the WAN 14 via the communications path 12, as before. However, the communications path 18 between the advertisers 16 and the WAN 14 is purely optional. In other words, the techniques of the present invention, allow an advertiser 16 to participate in a performance-based advertising program without the requirement that the advertiser 16 be coupled to the WAN 14 via the communications path 18. In fact, in accordance with the techniques disclosed herein, it is not necessary that the advertisers 16 have web pages 20. Instead, in accordance with the techniques disclosed herein, an alternative non-web based communications path 22 is provided between the clients 10 and the advertisers 16. According to embodiments of the present invention, the non-web based communications path 22 may be provided by a conventional telephone network. Alternatively, the non-web based communications path 22 may utilize Voice Over Internet Protocol (VoIP) technology to couple a client through switches of the network 14, and switches of a public telephone network, in a manner that does not require the advertisers 16 to have a connection to the network 14. In addition, the advertiser could be notified via other media channels, such as email, chat, instant message, etc.

Figure 3:
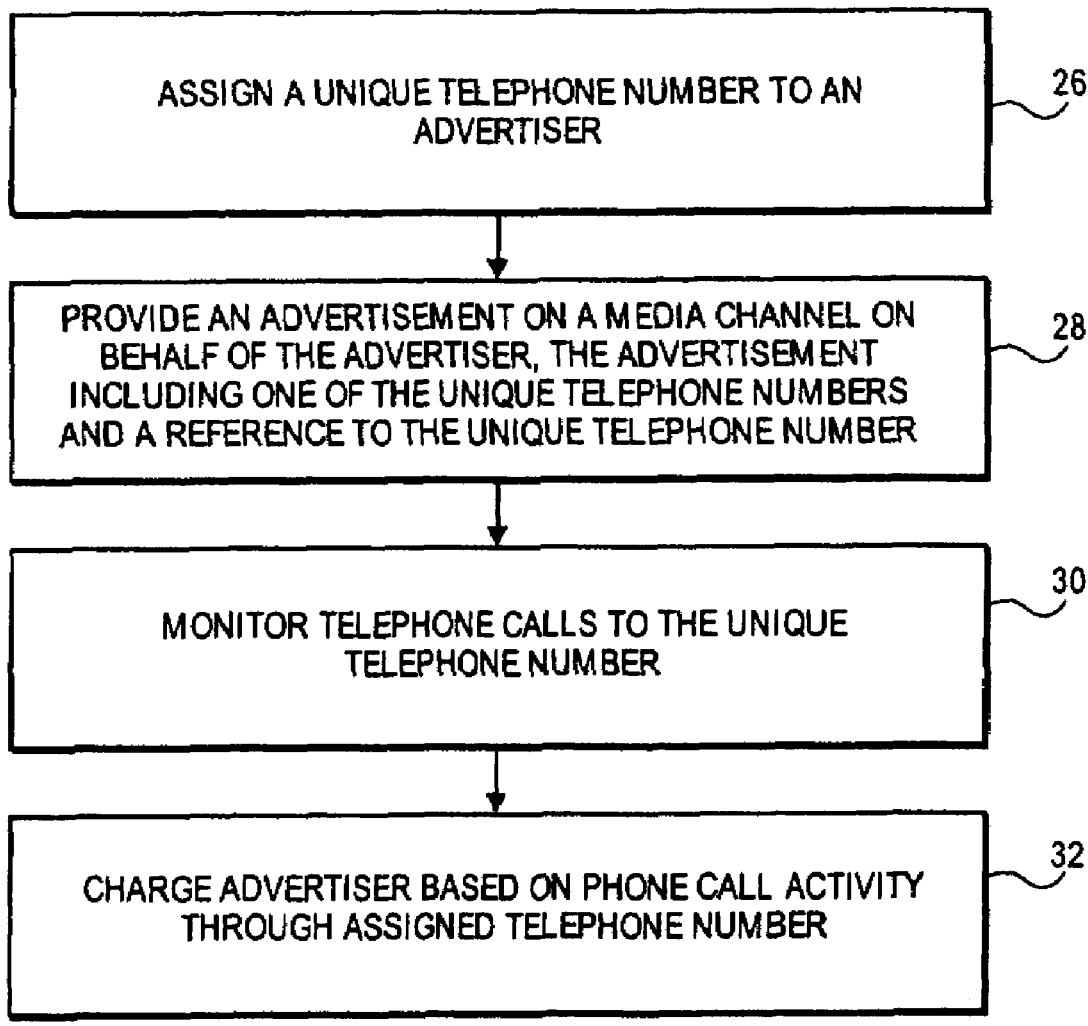
FIG. 3 shows a flowchart of operations performed in accordance with one embodiment of the present invention.

FIG. 3 of the drawings illustrates a technique to establish the non-web based communications path 22 of FIG. 2, in accordance with one embodiment. Referring to FIG. 3, at block 26, a unique telephone number is assigned to an advertiser 16. Thereafter, at block 28, an advertisement associated with the advertiser 16 is provisioned or published on a publication or media channel on behalf of the advertiser. The advertisement includes either the unique telephone number, or a reference to the unique telephone number. At block 30, telephone calls to the unique telephone number are monitored, as will be described. At block 32, the advertiser is charged based on the phone call activity through the assigned telephone number, as will be described.

Further, the techniques disclosed herein are not limited to publishing or providing advertisements for the advertisers 16 through web pages. Thus, in alternative embodiments, the unique telephone number assigned to an advertiser may be published or provided using a directory without the creation of a web page for the advertiser. The directory may be an existing directory or a new directory. The placement or ranking of the telephone number within the directory may be controlled through ranking techniques described below.

Figure 4:
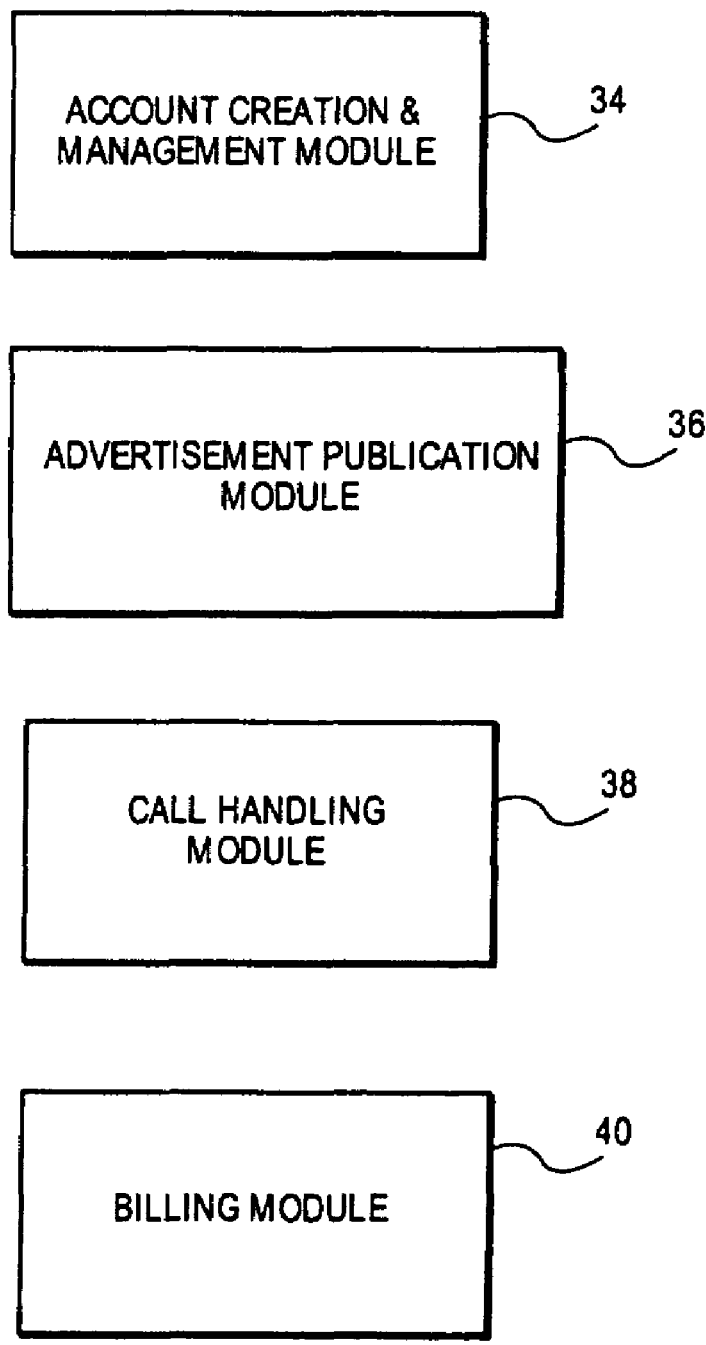
FIG. 4 shows a high level functional description of a system in accordance with one embodiment of the present invention.

FIG. 4 of the drawings shows a functional description of a system to implement the method of FIG. 3 is shown. Referring to FIG. 4, the system includes account creation and management module 34, advertisement publication module 36, call handling module 38, and billing module 40. In alternative embodiments, additional, less, or different modules may be included in the system without departing from the invention.

Figure 5:
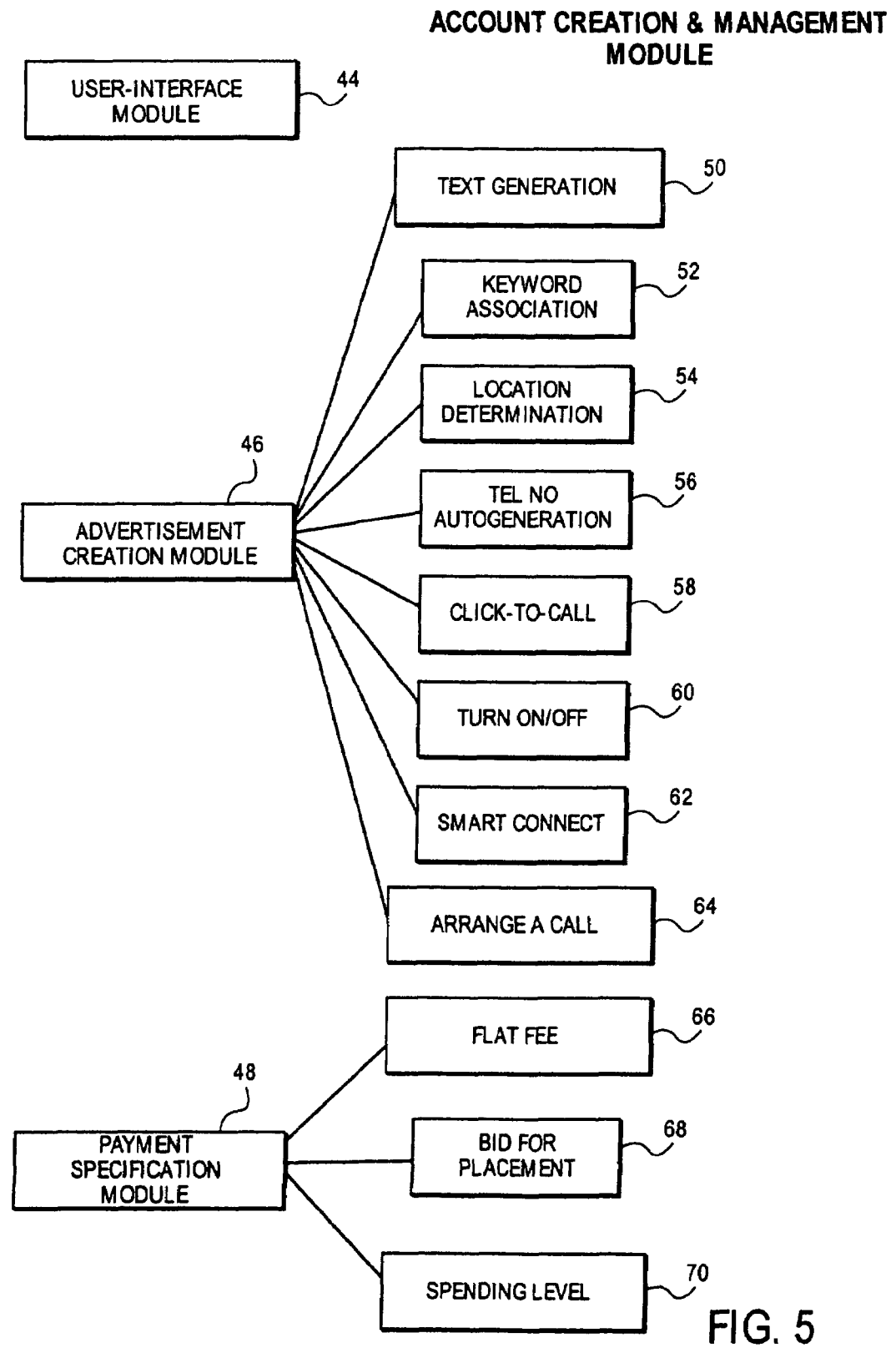
FIG. 5 illustrates the Account Creation and Management module of the system, in greater detail.
Figure 8A:
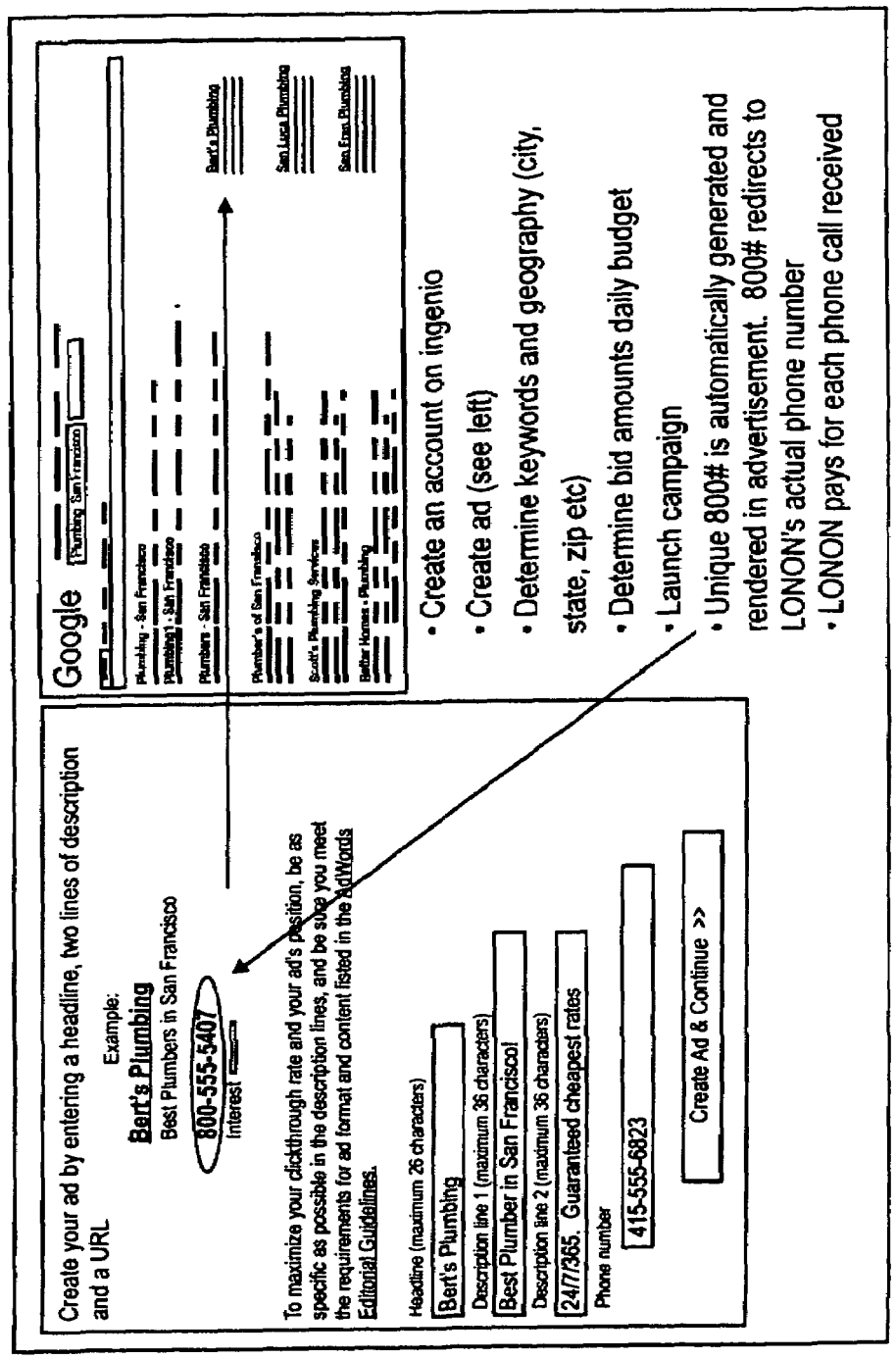
FIG. 8A shows an example of a user interface that may be presented to a user during advertisement creation, in accordance with one embodiment of the present invention.
Figure 8B:
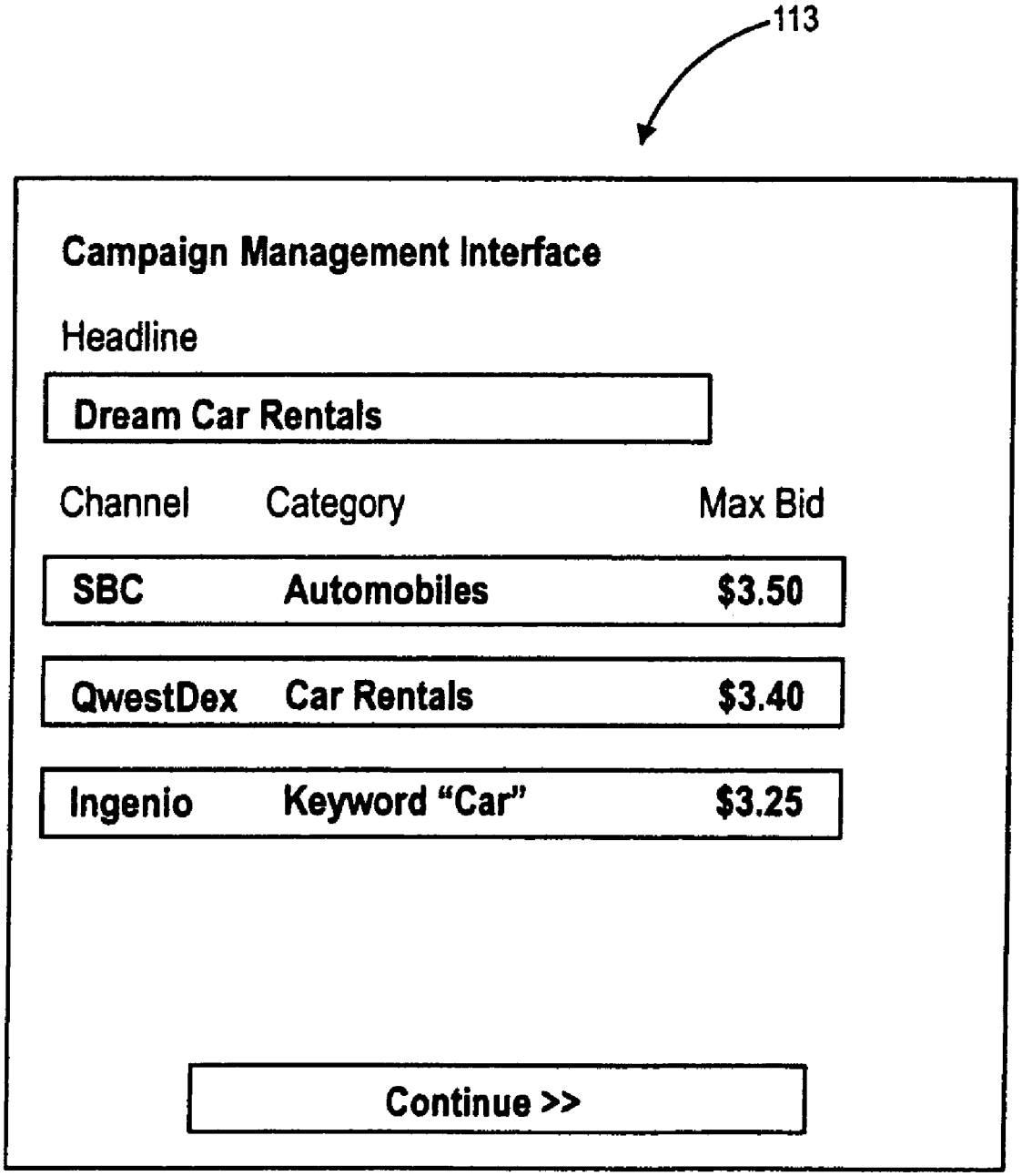
FIG. 8B shows a campaign management interface that is presented to a user, in accordance with one embodiment.

The components of the account creation and management module 34, in accordance with one embodiment, are shown in more detail in FIG. 5 of the drawings. Referring to FIG. 5, it will be seen that the account creation and management module 34 includes a user interface module 44, an advertisement creation module 46, and a payment specification module 48. The user interface module 44 includes logic to present information to a user, and to receive information from the user. For example, in one embodiment, the user interface module 44 causes a web page such as the web page 112 of FIG. 8 to be displayed on a browser of a client.

The advertisement creation module 46 includes text creation logic 50. The purpose of text creation logic 50 is to allow an advertiser 16, or an agent working on behalf of an advertiser 16, to input text for an advertisement which is ultimately created by the advertisement creation module 46. In order to enhance understanding of the present invention, for the remainder of this description, a local business enterprise called "Burt's Plumbing" will be used as an example of an advertiser that may benefit from the techniques disclosed herein. Burt's Plumbing may or not have direct connectivity to the network 14. If Burt's Plumbing does not have direct connectivity to the network 14, then a representative of Burt's Plumbing (hereinafter "Burt") will have to gain access to a computer that does have connectivity to the network 14 in order to view the web page 112 of FIG. 8A. For example, Burt could use a computer of a friend, a computer at a local library, etc. In another embodiment, a search operator, an Internet yellow page provider or other type of publisher could perform or administer this activity on behalf of Burt. The text creation logic 50 allows Burt to input for e.g. the text "Burt's Plumbing in San Francisco. Check out our special deals," which will be included in the advertisement when it is rendered. The module 46 also includes key word association logic 57 that allows Burt to input certain key words which are then associated with Burt's advertisement. The idea here is that when one of the clients 10 initiates a search through the search engine 19 using a key word that matches one of the key words entered by Burt, then Burt's advertisement will be displayed within a result of the search. Since Burt's Plumbing is not a national operation or enterprise it is necessary to display Burt's advertisement to clients within a certain geographic area. Thus, the module 46 includes location determination logic 54 that builds a geographic location association to Burt's advertisement. In one embodiment, the location determination logic 54 allows Burt to select a particular geographic location of interest, say for example San Francisco, so that Burt's advertisement will only be displayed to clients within the San Francisco area.

The module 46 also includes telephone number auto generation logic 56 that automatically generates a unique telephone number, maps the unique telephone number to Burt's actual telephone number such that when the unique number is called, Bert's phone rings, and associates the unique phone number with Burt's advertisement. In one embodiment, the telephone number that is automatically generated, may be a toll free number. In one embodiment, the telephone number may be a local number with the same area code as Burt's actual telephone number. In one embodiment, the telephone number may be an easily recognizable 800 number, modified by a unique extension mapped to Burt's business telephone number. For example, in one embodiment, a number could be the number "1-800-YEL-PAGES-1234." The 1234 portion of the 800 number is the unique extension that is mapped to Burt's telephone number so that when a searcher calls the number 1-800-YEL-PAGES-1234, the call will be automatically routed to Burt's telephone as will be described in more detail below.

In one embodiment, the advertisement creation module 46, automatically inserts the unique telephone number assigned to Burt directly into Burt's advertisement. Alternatively, click to call logic 58 may be invoked in order to generate a button, or a clickable telephone number, which is automatically inserted into Burt's advertisement, so that when the button or telephone number is selected or clicked by a user operating a client 10, a telephone call is automatically initiated to Burt's telephone number.

The module 46 also includes on/off logic 60 that allows Burt to selectively turn on or turn off an advertisement. Alternatively, the turn on/off logic 60 allows Burt to assign an active or an inactive status to a particular advertisement. When an advertisement is turned off or flagged as inactive, it is considered withdrawn, at least temporarily, from an advertisement campaign, and is therefore not made published e.g. through the search engine 19. Alternatively, only advertisements that are turned on, or have a status of "active" are published in accordance with the techniques disclosed herein.

The module 46 includes smart connect logic 62 that allows automatic routing of calls to various telephone numbers. For example, Burt may include a primary telephone number, and one or more secondary telephone numbers to be associated with his advertisement. Thus, in one embodiment, the smart connect logic 62 first routes the call to Burt's primary telephone number, and if no connection is achieved, then cyclically through Burt's list of secondary telephone numbers, until a connection is achieved.

The module 46 also includes arrange a call logic 64 that allows a searcher to input a time at which the searcher wishes to speak to Burt. The system then contacts Burt in order to arrange the call with the searcher. Burt may be contacted in a variety of ways, for example by sending a facsimile to Burt, by sending an email to Burt, by telephoning Burt, etc. to alert him of the arranged telephone call. In alternative embodiments, additional, less, or different logic may be included in the advertisement creation module without departing from the invention.

The payment specification module 48, allows Burt to select a particular model and various parameters associated with billing. The module 48 includes flat fee logic 66 that presents an option to Burt through the user interface module 44, which if selected will cause Burt to be billed on a flat fee basis for each telephone call received within a particular category, or subcategory. The module 48 also includes bid for placement logic 68, that, through the user interface module 44, presents an option to Burt to choose to be billed on a bid-for-placement basis, as described above. The logic 68 supports proxy bids, and maximum/minimum bids.

The module 48 also includes spending level logic 70 that allows Burt to specify daily/weekly/monthly spending levels. The specified spending level essentially defines a budget per time period such that if the budget is exceeded within a particular time period, then Burt's advertisement will be automatically flagged as inactive or turned off, for the remainder of the time period. Burt is notified of this activity by the system and Burt is given the option of reactivating his advertisement by adding additional funds to his account.

In one embodiment, the billing module 40 includes logic to automatically waive charges for leads (calls) from searchers/customers who have called Burt recently. For example, if a customer calls on one day, and then dials the same number for a follow-up call a day later, the system automatically waives the charge for the second call since this lead has already been paid for. Thus, the advertiser (Burt) does not have to be concerned about a customer using the advertised telephone number more than once and causing multiple charges. In one embodiment, the system of the present invention may be configured to waive the charges on leads from customers who have already called a particular advertiser within a specified number of days. In alternative embodiments, additional, less, or different logic may be included in the without departing from the invention.

Figure 6:
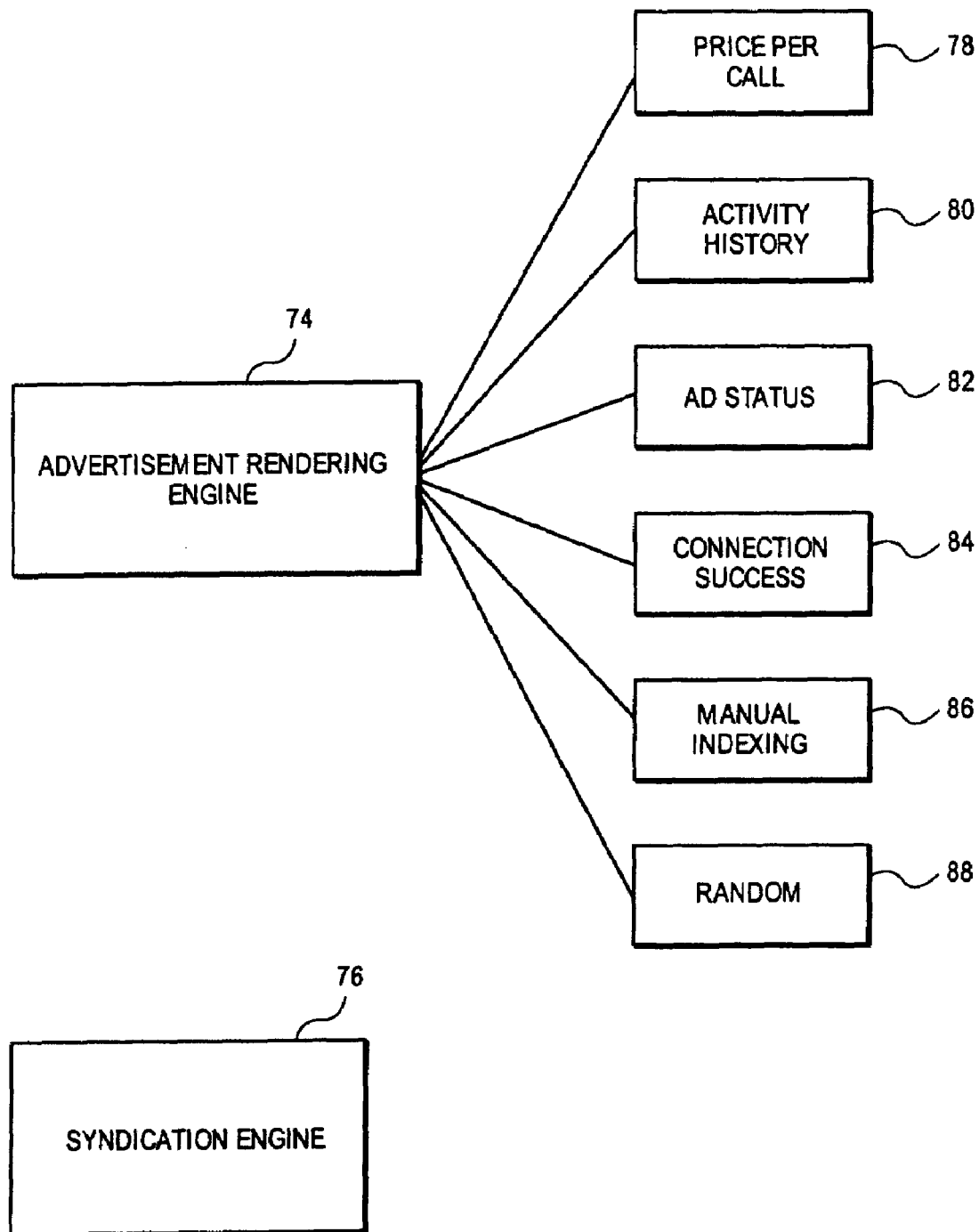
FIG. 6 illustrates the Advertisement Publication Module of the system, in greater detail.

Referring now to FIG. 6 of the drawings, the components of the advertisement publication module 36, are shown in greater detail. As will be seen, the module 36 includes an advertisement rendering engine 74, and an advertisement syndication engine 76. The purpose of the advertisement rendering engine 74 is to automatically render Burt's advertisement on a particular channel. In some embodiments, the advertisement rendering engine 74 causes a campaign management interface 113 (see FIG. 8B of the drawings) to be displayed to an advertiser. The interface 113 allows the advertiser to choose a channel, e.g., SBC, QwestDex, Ingenio, and a category in which the advertisement is to be provisioned/published. The interface 113 allows the advertiser to specify the maximum bid amount that the advertiser is willing to pay to provision the advertisement using the selected channel and category. FIG. 9 of the drawings shows an example of a web page 112 within which includes an advertisement rendered/provisioned in accordance with the techniques described herein. In one embodiment, this publication channel may be a web-based publication channel which is operated by an operator of the system of the present invention.

Alternatively, the syndication engine 76 may be used to syndicate Burt's advertisement to a number of third parties that host publication channels selected by Burt. Thus, in one embodiment, the syndication engine 76 may cause Burt's advertisement to be syndicated to third party search engines, Internet yellow pages, online directories, and other media.

As will be seen in FIG. 6 of the drawings, the advertisement rendering engine 74 includes price per call logic 78, activity history logic 80, call status logic 82, connection success logic 84, manual indexing logic 86, and random logic 88. Each of the logic components 78-88 controls a parameter that forms a basis of how Burt's advertisement is ultimately rendered. The price per call logic 78 causes Burt's advertisement to be published on a price per call basis. Thus, for example, if Burt is willing only to pay a low amount for each call, then his advertisement will be placed or ranked low down within a search result page or category of advertisers. Alternatively, if Burt is willing to pay a high price per call, then his advertisement will be placed higher up in the search result page or category of advertisers. The table below shows how the price per call logic 78 would rank or place advertisers within a channel based on a bid amount per call that an advertiser is willing to pay:

| Placement | Advertiser | (Bid Amount per call) |
|---|---|---|
| 1 | 800-349-2398 | ($3.88) |
| 2 | 866-324-3242 | ($3.22) |
| 3 | 800-323-5321 | ($2.01) |

The activity history logic 80 analyzes the number of calls Burt received in a give time period, for example the last day/week/month, and will rank Burt's advertisement within a display page based on the activity history. The call status logic 82, examines the status (active or inactive) of Burt's advertisement, and selectively publishes Burt's advertisement based on the status. The connection success logic 84 measures a connection success rate for calls to the telephone number assigned to Burt's advertisement and ranks Burt's advertisement within a display page based on the connection success rate. For example, if Burt's telephone number enjoys a low connection success rate then the logic 84 will cause Burt's advertisement to be ranked lowly within a publication page. The manual indexing logic 86 allows an operator to manually index or rank Burt's advertisement within a publication page. The random logic 88 allows Burt's advertisement to be randomly ranked or placed within a result page. In one embodiment, the ranking of Burt's advertisement within a display page may be based on any combination of the parameters controlled by the logic components 78-88 which may be dictated by a third party who employs the system. In alternative embodiments, additional, less, or different logic may be included in the advertisement rendering engine 74 without departing from the invention.

Referring now to FIG. 7 of the drawings, the components within the call handling module 38 include a call routing engine 92, and a call monitoring engine 94. As will be seen, the call routing engine 92 includes redirect logic 96 to cause redirection of a telephone call to the number assigned to Burt's advertisement. The redirection is to a telephone number specified by Burt during creation of the advertisement using the advertisement creation module 46. The call routing engine 92 also includes VoIP logic 98 to route a telephone call to or from a client to a telephone number specified by Burt in the advertisement using VoIP technology.

Figure 10:
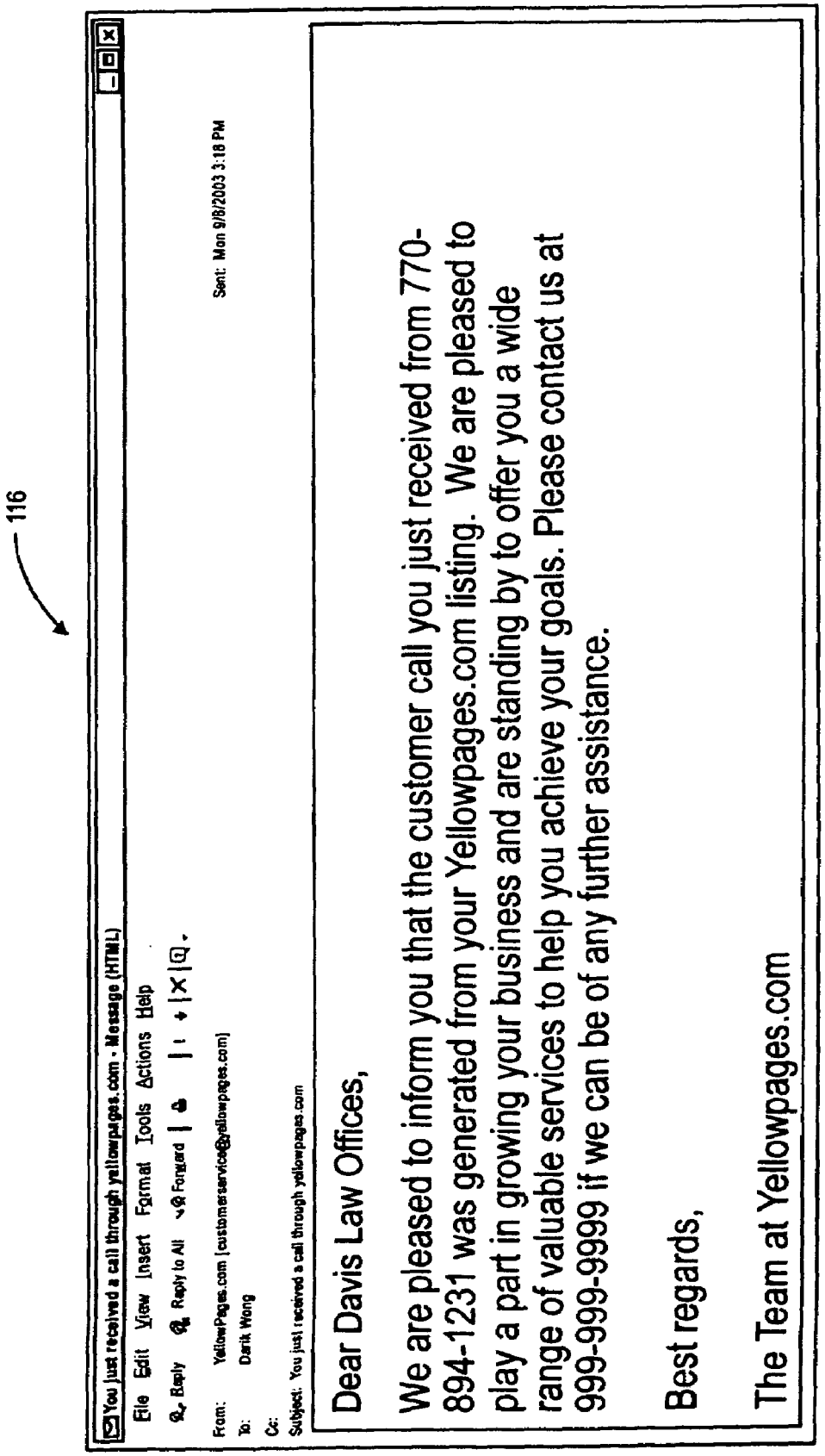
FIG. 10 shows an example of an email alert that is sent to an advertiser, when a call is generated, in accordance with one embodiment of the invention.

The call routing engine 92 may also include prompt logic 99 that causes a prompt to be played to a caller before routing of a telephone call to Burt's telephone number. In one embodiment, the prompt logic 99 plays an information prompt to the caller to inform the caller of Burt's actual telephone number. Thus, the caller may, in future, call Burt directly using Burt's actual telephone number instead of the telephone number assigned to Burt by the system. In such cases, Burt will not be billed by the system for telephone calls to his actual telephone number. In one embodiment, the prompt logic 99 may also cause an information prompt to be played to Burt to inform Burt of the source of the telephone call. In some cases, the prompt logic 99 may cause an email or facsimile alert to be automatically generated and sent to an advertiser, in order to inform the advertiser of the telephone number of the caller. An example of such an email is shown in FIG. 10 of the drawings and is marked as reference numeral 116. In alternative embodiments, additional, less, or different logic may be included in the call routing engine 92 without departing from the invention.

The call monitoring engine 94 includes call number logic 100 to track the number of calls generated in response to Burt's advertisement. The call monitoring engine 94 also includes Automatic Number Identification (ANI) logic 102 to identify the number of unique numbers of callers that call Burt, automatically. The call monitoring engine also includes call length logic 104 that monitors the length of each call to Burt. Connection status logic 108 monitors whether a call is successful, whether an engaged or busy tone is encountered, or whether Burt simply did not answer his telephone. Based on information supplied by logic components 100-106, a report is compiled and may be viewed by Burt. In one embodiment, the report includes a number of calls, the number of calls from unique telephone numbers, the telephone numbers of the callers, the length of each call, and the number of calls that were successful, for which an engaged tone was returned, or that went unanswered. The report may be used by Burt in order to monitor the effectiveness of an advertisement campaign, and to optimize the campaign. In alternative embodiments, additional, less, or different logic may be included in the call monitoring engine 94 without departing from the invention.

In one embodiment, the advertising publication module may publish the advertisement on a telephone-based advertising service. For example, the advertisement can be delivered to a consumer through audio as part of a voice portal or telephone-based directory such as a 411 telephone directory.

Figure 11:
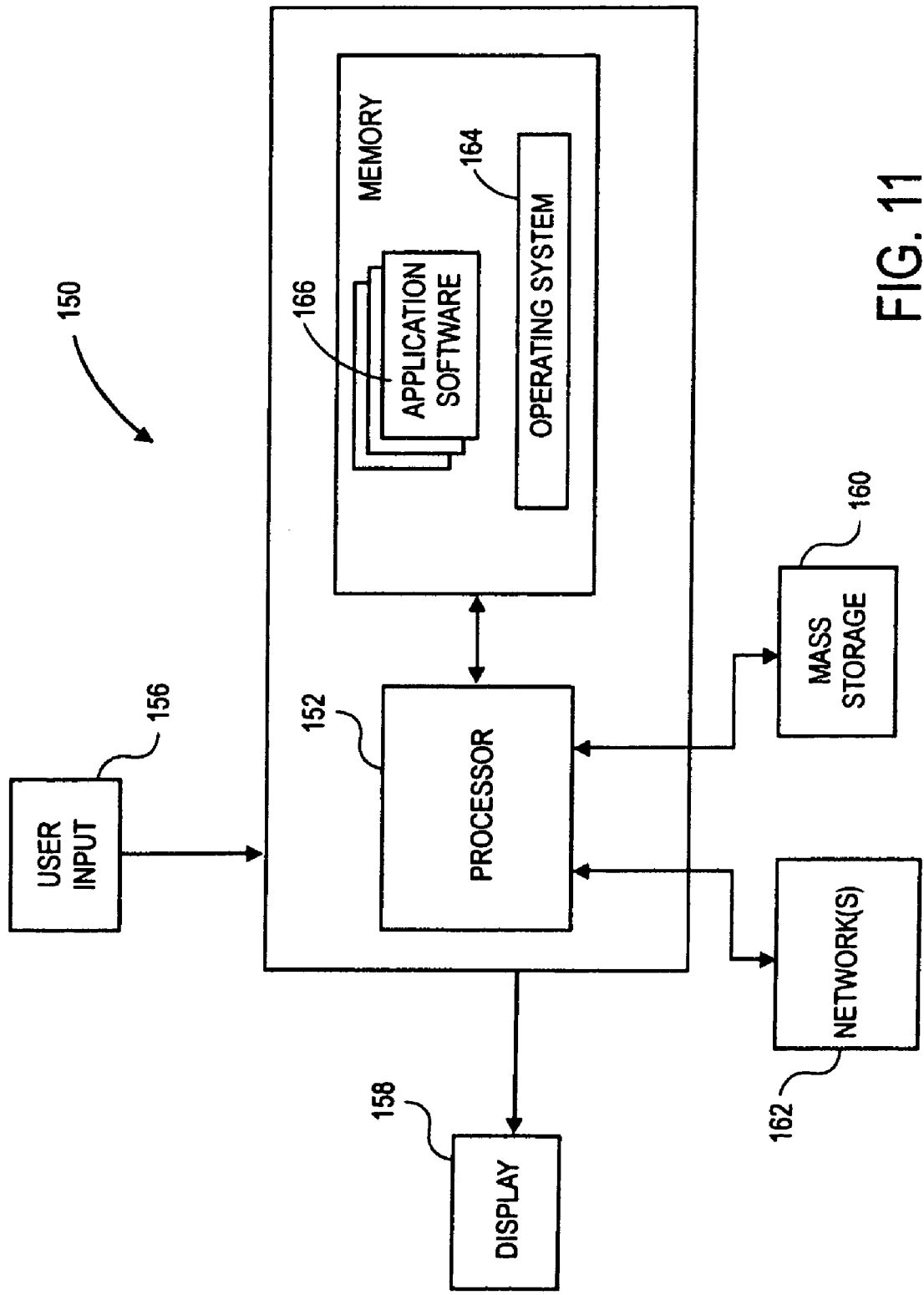
FIG. 11 shows a high level hardware block diagram of a system that may be implement the system, in accordance with one embodiment of the invention.

Referring to FIG. 11 of the drawings, reference numeral 150 generally indicates hardware that may be used to implement the above-described system. The hardware 150 typically includes at least one processor 152 coupled to a memory 154. The processor 152 may represent one or more processors (e.g., microprocessors), and the memory 154 may represent random access memory (RAM) devices comprising a main storage of the hardware 150, as well as any supplemental levels of memory e.g., cache memories, non-volatile or back-up memories (e.g. programmable or flash memories), read-only memories, etc. In addition, the memory 154 may be considered to include memory storage physically located elsewhere in the hardware 150, e.g. any cache memory in the processor 152, as well as any storage capacity used as a virtual memory, e.g., as stored on a mass storage device 160.

The hardware 150 also typically receives a number of inputs and outputs for communicating information externally. For interface with a user or operator, the hardware 150 may include one or more user input devices 156 (e.g., a keyboard, a mouse, etc.) and a display 158 (e.g., a Cathode Ray Tube (CRT) monitor, a Liquid Crystal Display (LCD) panel).

For additional storage, the hardware 150 may also include one or more mass storage devices 160, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 150 may include an interface with one or more networks 162 (e.g., a local area network (LAN), a wide area network (WAN), a wireless network, and/or the Internet among others) to permit the communication of information with other computers coupled to the networks. It should be appreciated that the hardware 150 typically includes suitable analog and/or digital interfaces between the processor 152 and each of the components 154, 156, 158 and 162 as is well known in the art.

The hardware 150 operates under the control of an operating system 164, and executes various computer software applications 166, components, programs, objects, modules, etc. (e.g. a program or module which performs operations described above. Moreover, various applications, components, programs, objects, etc. may also execute on one or more processors in another computer coupled to the hardware 150 via a network 152, e.g. in a distributed computing environment, whereby the processing required to implement the functions of a computer program may be allocated to multiple computers over a network.

As discussed above, the syndicate engine 76 is used to syndicate Burt's advertisement to a number of third parties. Additional examples of third parties include companies such as Yahoo!®, MSN®, AOL®, and other similar demand partners. Often times, these demand partners (also referred to herein as syndication partners) receive a percentage of the advertising revenue generated via the pay-per-call method and system described, herein. Thus, as in the example of the table above, the advertiser of placement 1 pays $3.88 per call received to phone number 800-349-2398. Now suppose the call to the advertiser of placement 1, resulted from an advertisement presented on a demand partner's website. The demand partner would be entitled to a percentage of that $3.88. The present method and system offers multiple embodiments for tracking, monitoring, and determining demand partner compensation.

Figure 12:
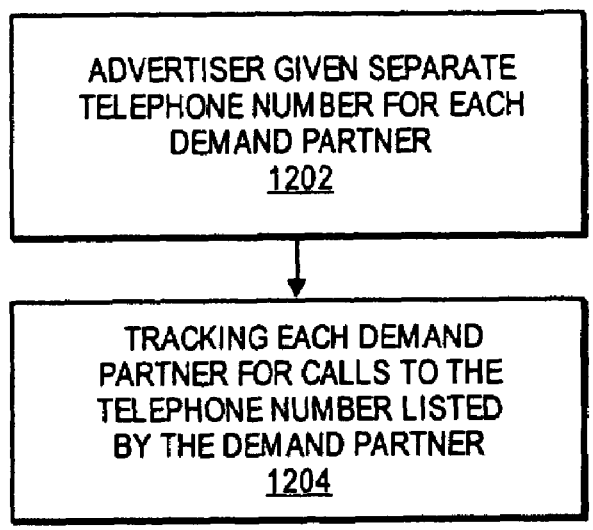
FIGS. 12-18 describe processes in accordance with embodiments of the invention to track/credit demand partners.

In one embodiment, described in the flow diagram of FIG. 12, in process 1202 an advertiser (also referred to herein as a merchant or listing) is given a separate telephone number for each separate demand partner that is posting the merchant's advertisement using. As described herein, in multiple embodiments, telephonic references, including telephone numbers and telephone extensions corresponding to a base telephone number, are assigned using the telephone number auto generation logic 56.

In one embodiment, the alias phone number is mapped to the advertiser's actual phone number, and calls made to the alias are monitored in order to track the respective demand partners. Therefore, in process 1204 billing module 40 tracks and/or credits demand partners a percentage of the revenue charged to the advertiser (or collected from the advertiser) for calls placed to the advertiser's alias telephone number corresponding to the respective demand partner.

Figure 13:
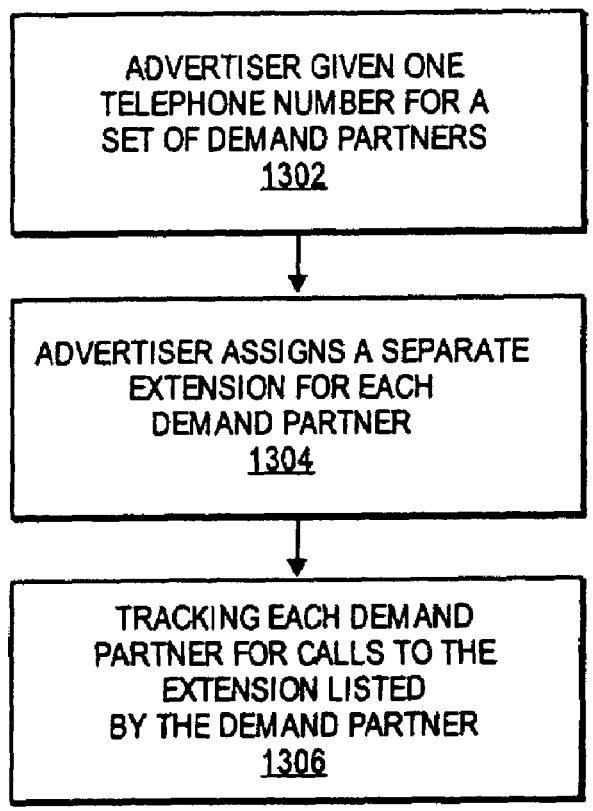

In another embodiment, described in the flow diagram of FIG. 13, in process 1302 an advertiser receives a single/base (the same) telephone number for a set of the demand partners. In process 1304, a separate extension is assigned to the advertiser for each of the separate demand partners. More specifically, the separate demand partners list the same telephone number for the advertiser, but also include an extension unique to the respective demand partner. For example, a listing could have the number "(800) new-cars" for the set of demand partners, but each demand partner posting the common telephone number for the advertiser would also provide a separate extension corresponding to the respective demand partner (e.g., ext. 102 corresponding to the XYZ syndication partner, ext. 104 corresponding to the ABC syndication partner, etc.) In process 1306, billing module 40 tracks and/or credits a demand partner a percentage of the revenue charged to the advertiser (or collected from the advertiser), for calls placed to the advertiser via the telephone extension corresponding to the respective demand partner.

Figure 14:
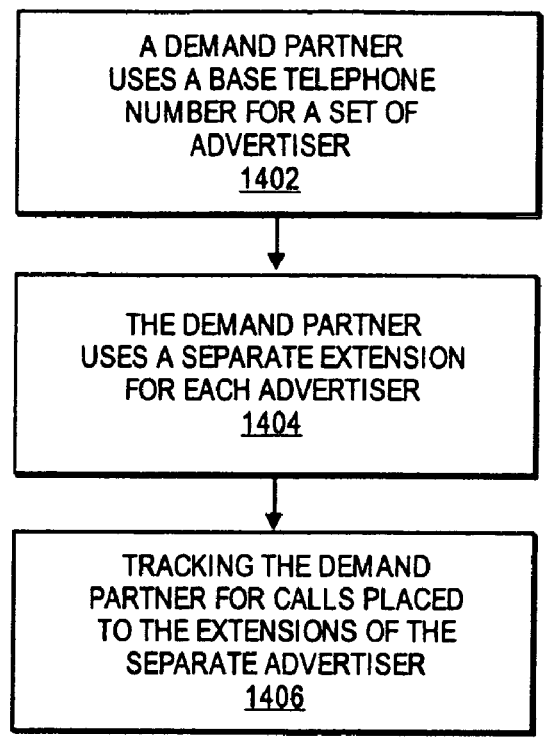

In an alternative embodiment, described in the flow diagram of FIG. 14, in process 1402 a demand partner uses a base telephone (i.e., a single) number for a set of advertisers. In process 1404, the demand partner provides a separate extension to each of the advertisers using the same base number. For example, the demand partner could use the telephone number (800) Call XYZ for a set of advertisers, and provide the extension 102 for Joe's plumbing, and extension 104 for Carl's plumbing, etc. In process 1406, billing module 40 tracks and/or credits a demand partner a percentage of the revenue charged to the advertiser (or collected from the advertiser), for calls placed to the advertiser via the base telephone number corresponding to the respective demand partner and the unique telephone extension assigned to the advertiser at the respective demand partner.

Figure 15:
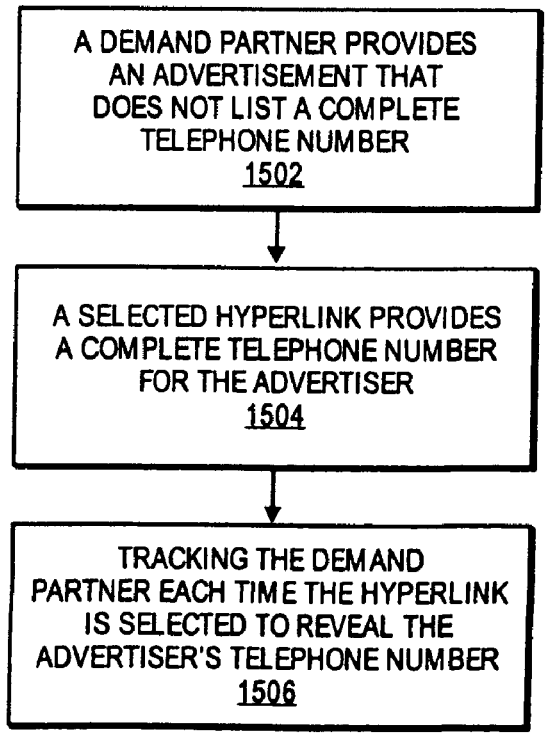

According to another embodiment, a click-to-reveal method is proposed, as described in co-pending U.S. patent application Ser. No. 60/552,124, entitled "A Method and Apparatus to Provide Pay-Per-Call Performance Based Advertising and Billing" filed on Mar. 10, 2004, herein incorporated by reference. As described in the flow diagram of FIG. 15, in process 1502 a user is presented with an advertisement via a demand partner's website. The advertisement does not show the advertiser's complete phone number, but instead contains a hyperlink to reveal the advertiser's phone number, or the remaining portion of the telephone number. In process 1504, the Advertisement rendering engine 74 monitors the number of click-throughs to reveal the advertiser's number. In one embodiment, it is assumed that each click-through from a demand partner results in a call to the respective advertiser. As a result, in process 1506 billing module 40 tracks and/or calculates an amount to credit a demand partner based at least in part on a number of click-throughs to reveal an advertiser's telephone number.

Figure 16:
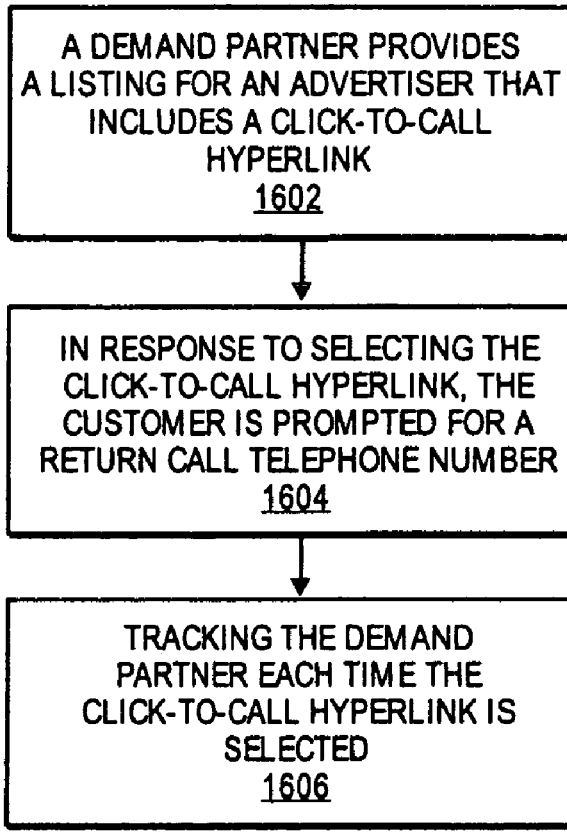

In yet another alternative embodiment, a demand partner is provided with a click to call format. In one embodiment, as described in the flow diagram of FIG. 16, in process 1602 in addition to listing a telephone number for an advertiser (or in place of listing a telephone number for the advertiser) a link is provided by the demand partner to initiate establishing a telephone connection between the viewer/customer and the advertiser in response to the viewer/customer activating/selecting the hyperlink provided. In one embodiment, in process 1604, in response to activating/selecting the hyperlink provided, the viewer/customer is prompted for their telephone number to establish the telephone connection with the advertiser. After the customer enters their telephone number, a telephone connection is established between the customer and the advertiser.

In yet another embodiment, if the viewer/customer has a VoIP communications device, VoIP logic 98 may connect the advertiser to the viewer/customer without the need for the customer/viewer to provide their telephone number. The VoIP communications device includes telephony devices attached to the user's computer, as well as mobile communication devices, such as PDA's and cellular phones.

In the embodiment employing a click to call (for PSTN and VoIP connections), in process 1604, a demand partner providing the click to call option would be tracked/credited (i.e., a percentage of the charge to the advertiser) each time a viewer/customer selects/activates a click to call icon for the respective advertiser.

Figure 17:
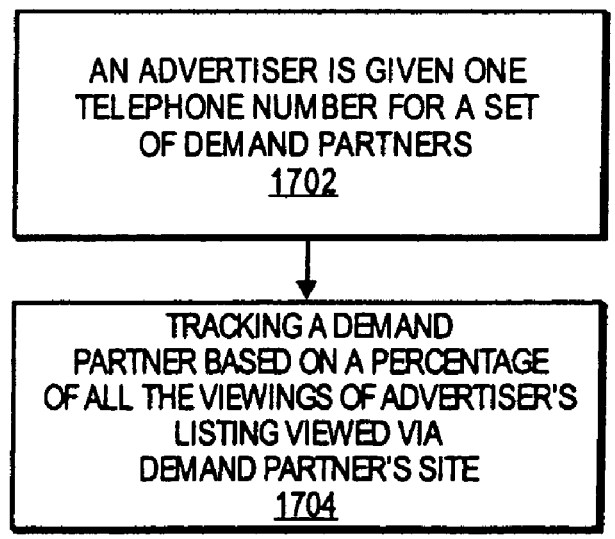

In another embodiment, described in the flow diagram of FIG. 17, in process 1702 an advertiser is given one telephone number for a set of demand partners. In process 1704, credits to the demand partners for calls placed to the advertiser's listed telephone number are prorated based on a number of page views for the advertiser's telephone number listing via the respective demand partners. For example, if 70% of the advertiser's page views are accessed via demand partner ABC, and 30% of the advertiser's page views are accessed via demand partner XYZ, the ABC demand partner would receive 70% and the demand partner XYZ would receive 30% of the credits payable to the demand partners for calls placed to the advertiser's listed telephone number.

Figure 18:
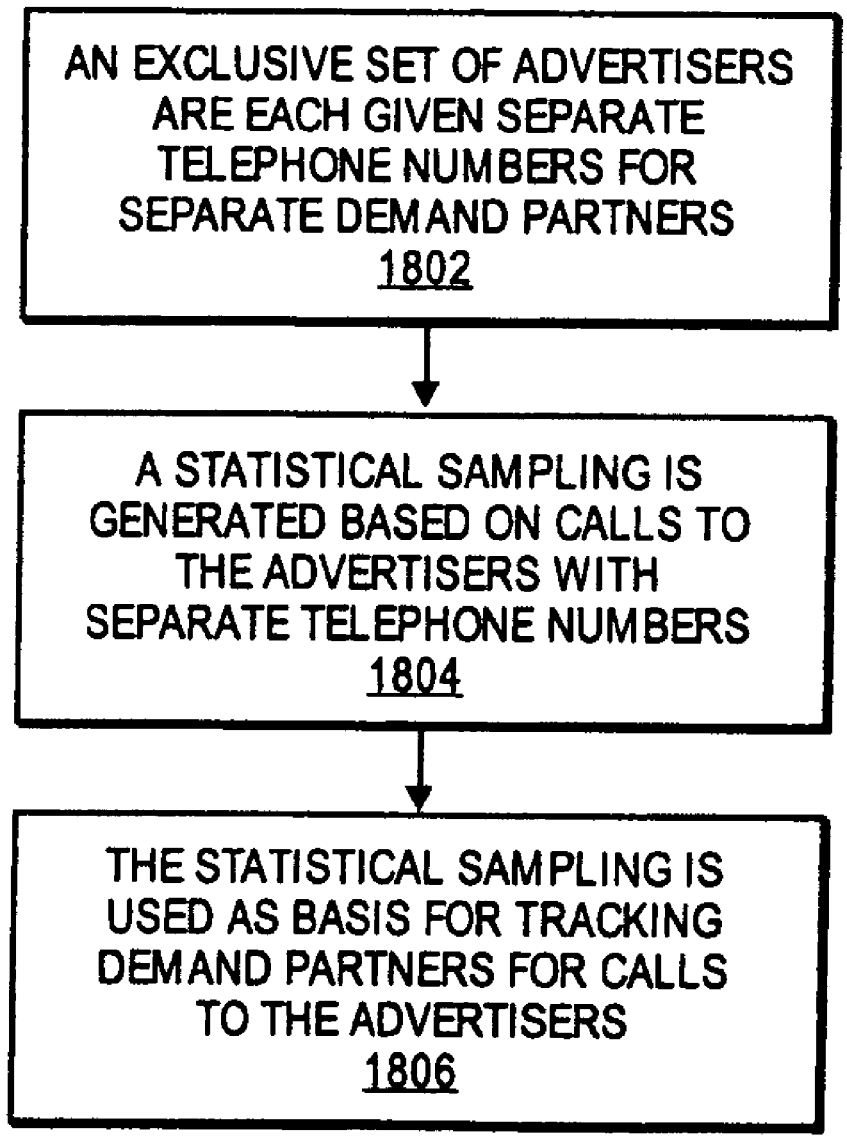

In another embodiment, described in the flow diagram of FIG. 18, in process 1802 at least a first set of advertisers are given unique telephonic reference for each demand partner. One or more advertisers are each given one telephonic reference for a set demand partners.

In process 1804, a statistical sampling of calls to advertisers with the unique telephonic reference is generated. In one embodiment, the statistical sampling represents a sampling of a percentage of calls to an advertiser (or set of advertisers) that originate from an advertisement listed by a first demand partner compared to calls that originate from the same (or similar) advertisement listed by other demand partners. In one embodiment, the samplings may be separated based on a category of advertisers (e.g., restaurants, automobiles, etc.).

In process 1806, the samplings are used as a basis for tracking/crediting the demand partners with a percentage of the charges to at least a set of the advertisers. Consider the example advertisers 1 and 2 are given each give unique telephone, and 70% of the calls to advertisers 1 and 2 are from telephonic references listed by partner ABC. Given the example, an assumption is made that 70% of the calls to the advertisers using a common number among the demand partners, are originated from advertisements listed by partner ABC.

Therefore, in one embodiment, based on the statistical sampling, partner ABC would be credited for 70% of the calls placed to the advertisers using a common number among the demand partners. In one embodiment, tracking/crediting the demand partners based on the statistical sampling could also be applied to the advertisers using unique numbers among the demand partners.

As described above, telephone-call tracking is used to determine the number of phone calls a particular party, or directory, has received. It can be useful for a variety of purposes. It is particularly useful in measuring the success of advertising. For instance, a telephone directory may offer advertising placements to its advertisers, such as plumbers. By tracking the number of phone calls a particular advertisement has received, the directory can demonstrate the value of its advertising to the advertiser.

Telephone-call tracking can be used to measure the effectiveness of a variety of advertising vehicles in addition to the physical yellow-pages phone book. Newspaper classifieds can utilize call tracking, as can television commercials that display phone numbers for consumers to call. By counting the number of telephone calls such advertisements receive, the campaign's effectiveness can be measured. This is of benefit both to the advertiser and to the directory.

Telephone-call tracking can be also used as such in directories that are online, such as an online yellow pages. Similarly, it can be used to track the success of online search advertising, such as keyword advertising.

Telephone-call tracking is particularly useful in pay-for-performance advertising systems, as described in several embodiments above. In pay-for-performance systems, advertisers pay when an advertisement performs. For instance, an advertiser can pay $1 each time a potential customer clicks on an online-search advertisement. Similarly, in pay-per-call advertising systems, such as that covered in Application Number X (application Ser. No. 10/872,117), an advertiser's payments are linked to the number of calls that advertiser receives. In such a pay per call advertising system, call tracking is vital, since counting the number of calls received determines the amount that the advertiser must pay. In one embodiment, not only are the number of calls received counted but also the time of the call, since in one embodiment an advertiser may bid to pay a higher price per call in order to receive a more prominent placement for their advertisement.

Not only is it important to track the number of calls and precise time of calls, but the demand source at which the caller viewed the advertisement may also be tracked. Online directories can have many different external web sites through which they syndicate the same advertisers, and it is important to know from which web site the phone call originated so that, in some cases, the directory can compensate the external web site for having brought customer. Application Number Y (application Ser. No. 60/560,926) outlines this case.

Tracking phone calls may include publishing a unique phone number that is different from the advertiser's standard phone number. When a caller views the advertisement, the unique phone number appears, and the caller dials it. The call coming in on the unique phone number is then rerouted, using the call tracker's telephony equipment, to the advertiser's standard phone number. In addition to rerouting the call, the call tracker also records that a call was made and the precise time of the call. In a pay-per-call advertising system, this information can be used to bill the advertiser for the call.

In cases where directories would also like to identify the demand source of the call, a single advertiser will have to be given multiple unique phone numbers, one for each demand source where that advertiser appears. For instance, the advertisement of a single plumber might be displayed in two different online directories and three different online search engines. In order to track which of these demand sources produced a call from a customer, the single plumber would have to be assigned five different unique telephone numbers. By monitoring which unique phone number was dialed, it can be determined which demand source deserves the credit for producing the call.

Mobile/Wireless Examples

Figure 19:
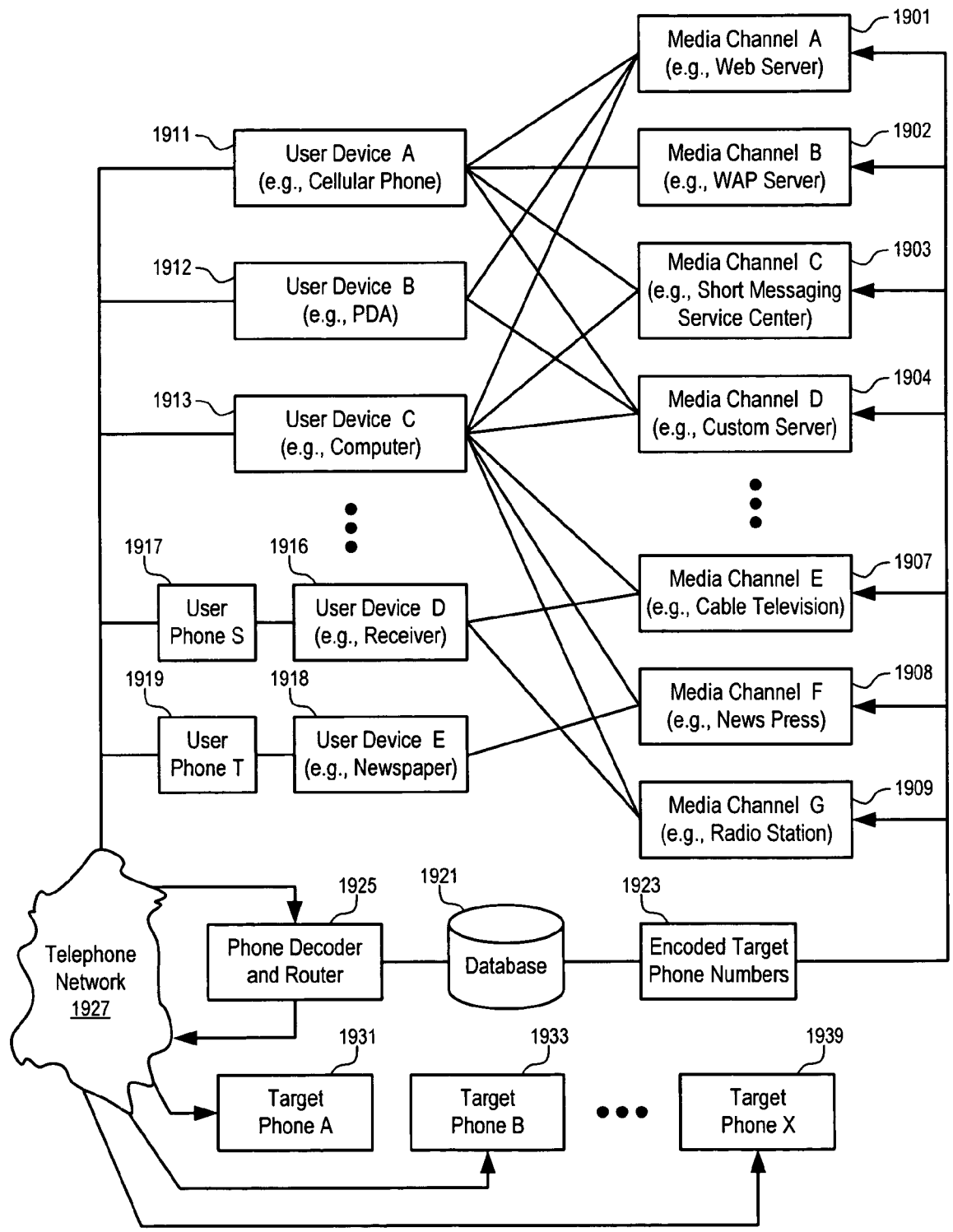
FIG. 19 shows a diagram of a system to make and track phone connections according to one embodiment of the present invention.

FIG. 19 shows a diagram of a system to make and track phone connections according to one embodiment of the present invention.

In FIG. 19, a database (1921) may contain the phone numbers of target phone A (1931), target phone B (1933), . . . , target phone X (1939), etc. Typically, the target phones belong to the institutions, businesses, individuals, etc, which seek for publicity through various media channels, such as media channel A (1901) (e.g., web server), media channel B (1902) (e.g., WAP server), media channel C (1903) (e.g., short messaging service center), media channel D (1904) (e.g., custom server), media channel E (1907) (e.g., cable television), media channel E (1908) (e.g., news press), media channel G (1909) (e.g., radio station), etc.

In one embodiment of the present invention, the phone numbers of the target phones are not directly publicized over the media channels. Instead, encoded target phone numbers (1923) are used. Using the encoded target phone numbers (1923), a user cannot reach target phones directly. The encoded target phone numbers (1923) allow the association of additional information with the target phone numbers, such as the media channels used, special promotions, etc.

The encoded target phone numbers are delivered with content information (e.g., web page, WAP page, short message, television programs, news articles, etc.) to user devices, such as user device A (1911) (e.g., cellular phone), user device B (1912) (e.g., personal digital assistant (PDA)), user device C (1913) (e.g., computer), user device D (1916) (e.g., receiver), user device E (1918) (e.g., newspaper).

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, a SMSC, etc.).

In one embodiment, a user device is capable to dial a phone call (e.g., automatically according to the encoded phone number embedded in the content information when a user selects the number). Alternatively, a user may manually dial a phone call using a separate phone, such as user phone S (1917) or user phone T (1919).

In one embodiment of the present invention, dialing at least a portion of an encoded target phone number connects the phone call to a phone decoder and router (1925) first. According to the encoded target phone number dialed, the phone decoder and router (1925) determines the corresponding target phone number using the database (1921) and connects the phone call to the corresponding target phone (e.g., one of target phones 1931-1939) through the telephone network (1927).

Note the telephone network (1927) may be circuit switched, package switched, or partially circuit switched and partially package switched. For example, the telephone network may partially use the Internet to carry the phone call (e.g., through VoIP). For example, the connection between the user phone/device and the phone decoder and router (1925) may be carried using VoIP; and the connection between the phone decoder and router (1925) may be carried using a land-line based, circuit switched telephone network.

In one embodiment of the present invention, the information associated with the encoded target phone number, such as the media channel used to provide the encoded target phone number to the users, is also decoded/retrieved using the database (1921). Thus, the information associated with the encoded target phone number can be tracked/stored.

In one embodiment, the phone decoder and router (1925) also determines the phone number of the user through Automatic Number Identification (ANI). ANI is a phone system feature that provides the billing number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment of the present invention, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment of the present invention, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (1925). In such an arrangement, a large number of encoded phone numbers are generally required to differentiate the different target phones and different media channels.

In one embodiment of the present invention, an encoded target phone number has more digits than a standard phone number. A first portion of the encoded target phone number has the same number of digits as a standard phone number to reach the phone decoder and router (1925) through the telephone network (1927); and a second portion of the encoded target phone number is to be decoded by the phone decoder and router (1925). For example, the Dual Tone Multi-Frequency (DTMF) decoder can be installed in the phone decoder and router (1925) to detect the second portion of the encoded target phone number dialed at the user phone. The detected phone number can then be used to recover the target phone number.

In one embodiment of the present invention, a single telephone number is used to reach the phone decoder and router (1925) for different target phone numbers; and the portion of the encoded target phone number that is used to reach the phone decoder and router (1925) is not used in determining the information associated with the encoded target phone number.

Alternatively, multiple telephone numbers can be used to reach the phone decoder and router (1925); and the entire encoded target phone number can be used to determine the information associated with the encoded target phone number.

In one embodiment of the present invention, the encoded target phone numbers can have different numbers of digits. The advertisers may be arranged to bid for shorter encoded target phone numbers.

In one embodiment of the present invention, the encoded target phone numbers are assigned only when needed for use in a media channel.

In one embodiment, a look-up table approach is used to encode the information. For example, the database (1921) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of field separated by "*" or "#". Each of the field can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (1925). When such a mapping scheme is used, a look up table is not necessary. For example, an encoded target phone number may include a first portion that is the phone number of the phone decoder and router (1925), a second portion that is the target phone number appended with a number mapped from an identifier of the media channel. To prevent the user from dialing the target phone number directly, an encryption/scrambling scheme can be used to encode the second portion, which is decoded at the phone decoder and router (1925).

In one embodiment of the present invention, the phone decoder and router (1925) determines the target phone number from the encoded target phone number dialed by the user and then dials the target phone number for the user and joins the phone calls so that the user can talk to the target phone.

In one embodiment of the present invention, users dial the encoded target phone numbers manually. A user can dial the encoded target phone number regardless the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment of the present invention, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number.

In one embodiment of the present invention, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment of the present invention, the encoded target phone numbers are formatted so that the user device dials a first portion of the encoded target phone numbers to access the phone decoder and router (1925), pauses for a short period of time for the phone decoder and router (1925) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 19, the user device initiates the phone call. Alternatively, a phone router may be used to initiate phone calls both to the user device (or a separate user phone) and the target phone and then join the phone calls to connect the user to the target phone. For example, when the user selects the encoded target phone number, the selection of the target phone number is transmitted to the phone router with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

Figure 20:
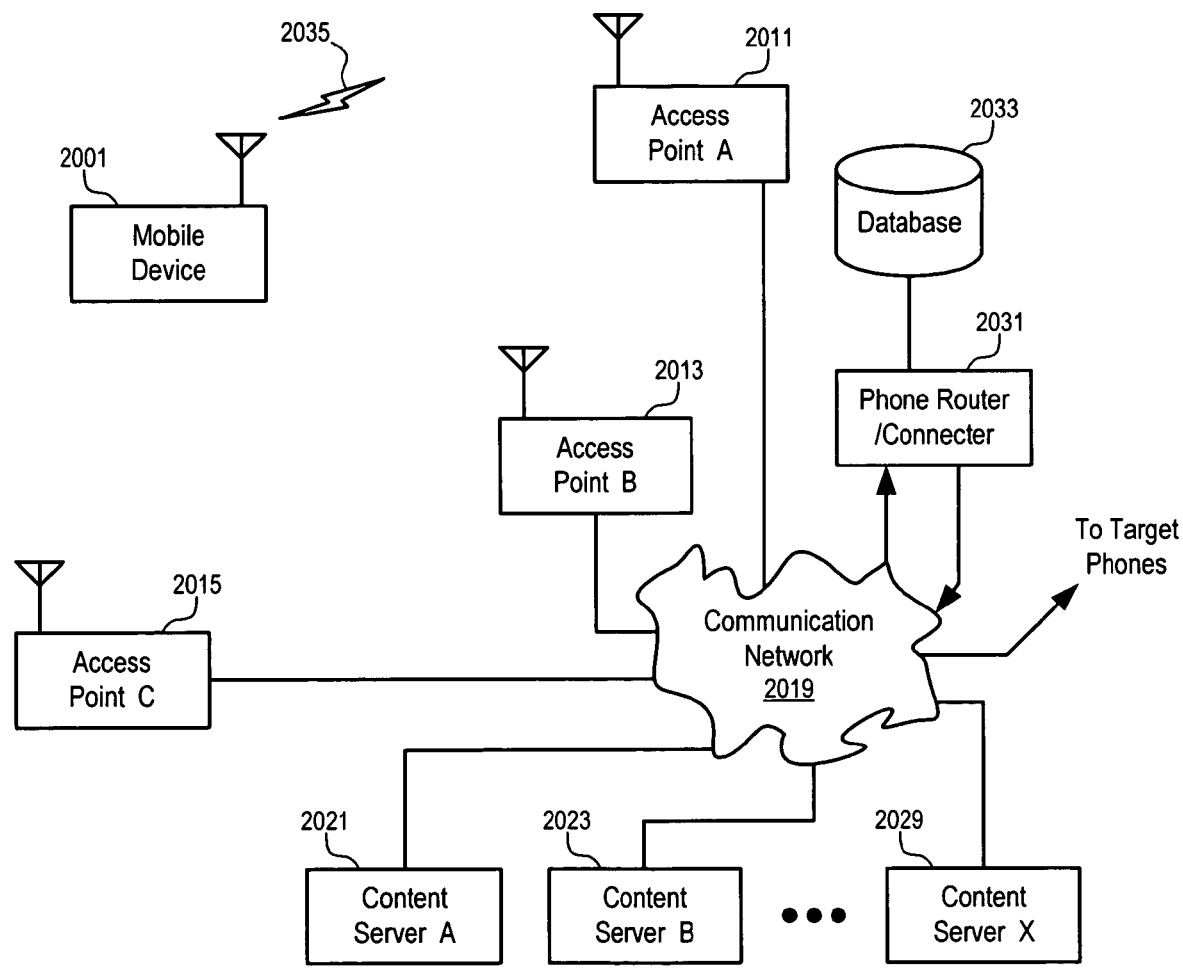
FIG. 20 shows a diagram of a system to make and track phone connections from a mobile device according to one embodiment of the present invention.

FIG. 20 shows a diagram of a system to make and track phone connections from a mobile device according to one embodiment of the present invention.

In FIG. 20, a mobile device (2001) accesses content server A (2021), content server B (2023), content server X (2029), etc., through a wireless link (2035) to a access point, such as access point A (2011), access point B (2013), and access point C (2015). In general, the access points may be of different types. For example, the access point may be a cellular base station, an access point for wireless local area network (e.g., a WiFi access point), an access point for wireless personal area network (e.g., a Bluetooth access point), etc. The access point connects the mobile device to the content servers through a communication network (2019), which may include the Internet, an intranet, a local area network, a public switched telephone network (PSTN), private communication networks, etc.

In one embodiment, the content servers provide encoded target phone numbers, which when dialed connect the mobile device to the phone router/connecter (2031) which used the database (2033) to decode the encoded information and/or store the information about the phone call in the database (2033). The router/connecter (2031) further connects the mobile device to the target phones. Alternatively, the router/connecter (2031) may dial phone calls to the mobile device and the corresponding target phone and then join the phone calls to connect the mobile device and the target phone.

In one embodiment of the present invention, location-dependent content information is delivered from a content server to the mobile device. The user may enter the location manually (e.g., through text input or voice input which is processed through a speech recognition system). The content information may be presented on a display screen or using an audio channel through a text to speech system.

Alternatively, the location of the mobile device may be determined automatically, which is then used to determine the location-dependent content information. For example, the location of the mobile device may be determined through a Global Positioning System (GPS) receiver that is connected to, or built within, the mobile device.

A location of a cellular phone can also be determined using a method known as Time Difference of Arrival (TDOA) in which the reception times of a cellular signal from a mobile station are measured at several base stations to determine the position of the cellular phone. Alternative, a method known as Advanced Forward Link Trilateration (AFLT), or Enhanced Observed Time Difference (EOTD), can be used, which measures the reception times of cellular signals from several base stations to the cellular phone. Alternatively, the cellular site in which the mobile device can communicate to a based station can be used to determine a rough position of the cellular phone. In general, any method used by a cellular phone provider to get location information (e.g., for emergency service) can be used.

An access point for a wireless local area network or a wireless personal area network typically has a small coverage area. Based on the location of the access point, location information (e.g., the city, or more precise location information) can be obtained.

Further, ANI can also be used to determine the location information. Although the location information determined from ANI may not represent a correct position of a mobile device, content information about the location determined from ANI may still be of interest to the user.

In one embodiment of the present invention, when the user performs a search for information which may be location dependent, the location automatically determined for the mobile device is used with the search request. For example, when the user search for "hotels" without specifying a location using an SMS-based search, the city in which the mobile device is located is determined; and a pay-per-call list of hotels in the city is sent via SMS to the mobile device.

In one example, the user may search for "dentists" in a custom client application; and a custom server application provides a pay-per-call list of "dentists" close to the current position of the mobile device.

In one example, the user may search in a web page or a WAP page for a particular subject. The return results include one or more pay-per-call advertisements to be presented in a browser running in the mobile device.

In one embodiment of the present invention, certain content information is automatically channeled into the mobile device when the mobile device enters into a wireless access zone. For example, when the mobile device enters into a commercial district, pay-per-call lists of various nearby points of interest, such as hotels, movie theaters, restaurants, etc., can be automatically presented on the mobile device, according to user preferences.

In one embodiment of the present invention, a user may search for particular types of experts, businesses, institutions, persons, etc. When the user is interested in calling one selected entity (e.g., an expert, a doctor, a restaurant), the mobile device can automatically dial the encoded phone number of the entity without the user manually dial the number; and the phone router/connecter decodes the information and connects the mobile device to the phone of the selected entity. Alternatively, the phone number of the mobile device may be determined (e.g., through ANI, or user input, or user preference setting); and the phone connector connects phone calls to both the mobile device and the phone of the selected entity to connect the user to the selected entity. In such a process, the identity of the mobile device may be kept anonymous from the selected entity; and the identity of the selected entity may also be kept anonymous from the user of the mobile device.

Figure 21:
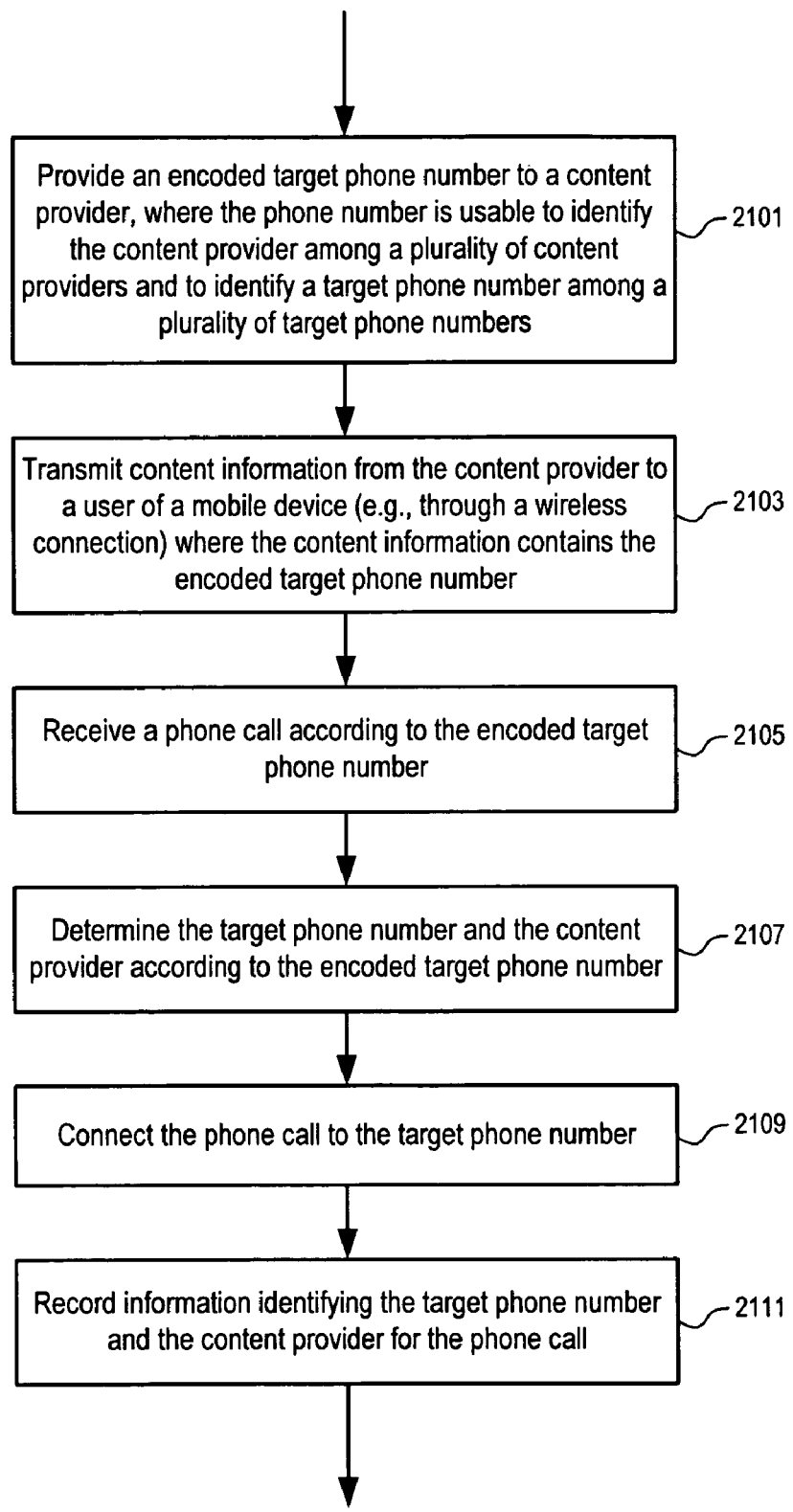
FIGS. 21-22 show flow diagrams of making and tracking phone connections according to embodiments of the present invention.
Figure 22:
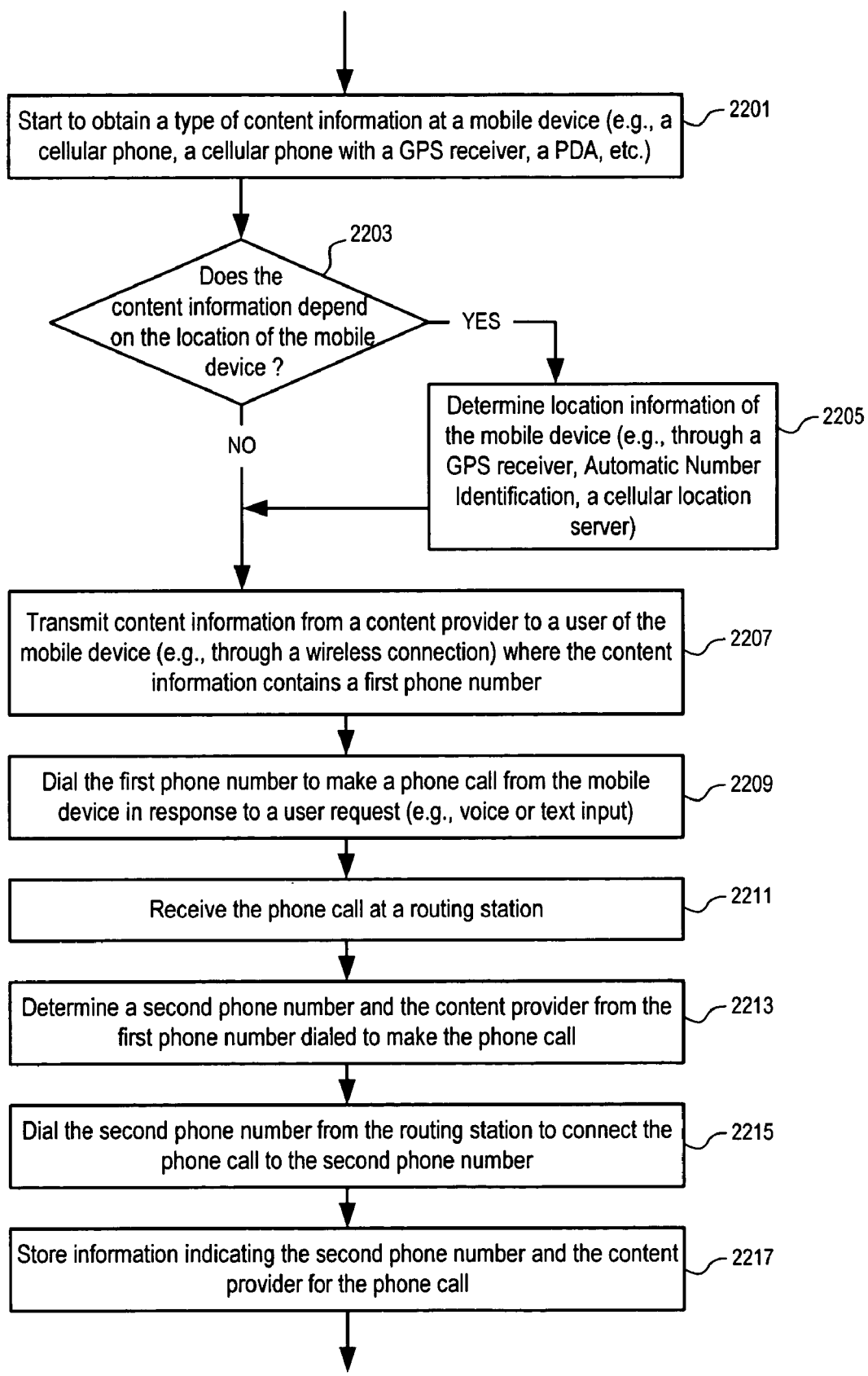

FIGS. 21-22 show flow diagrams of making and tracking phone connections according to embodiments of the present invention.

In FIG. 21, operation 2101 provides an encoded target phone number to a content provider, where the phone number is usable to identify the content provider among a plurality of content providers and to identify a target phone number among a plurality of target phone numbers.

Operation 2103 transmits content information from the content provider to a user of a mobile device (e.g., through a wireless connection) where the content information contains the encoded target phone number. The content information may include, pay-per-call advertisements, lists of experts, lists of points of interests, etc.

After operation 2105 receives a phone call according to the encoded target phone number, operation 2107 determines the target phone number and the content provider according to the encoded target phone number; and operation 2109 connect the phone call to the target phone number.

Operation 2111 records information identifying the target phone number and the content provider for the phone call. The recorded information can be used to bill for advertisements and/or for making phone connections, provide credit/compensation for the content provider, and provide information for fine-tuning advertisement operations.

In FIG. 22, operation 2201 starts to obtain a type of content information at a mobile device (e.g., a cellular phone, a cellular phone with a GPS receiver, a PDA, etc.)

If operation 2203 determines the content information depends on the location of the mobile device, operation 2205 determines location information of the mobile device (e.g., through a GPS receiver, Automatic Number Identification, a cellular location server). The location may be determined at the mobile station or determined at a server station.

Operation 2207 transmits content information from a content provider to a user of the mobile device (e.g., through a wireless connection) where the content information contains a first phone number.

Operation 2209 dials the first phone number to make a phone call from the mobile device in response to a user request (e.g., voice or text input). In one embodiment the mobile device dials the first phone number without the user manually dialing the individual digits of the first phone number.

After operation 2211 receives the phone call at a routing station, operation 2213 determines a second phone number and the content provider from the first phone number dialed to make the phone call. Operation 2215 dials the second phone number from the routing station to connect the phone call to the second phone number.

Operation 2217 stores information indicating the second phone number and the content provider for the phone call. The second phone number can be used to bill for the connection; and the content provider can be credited/compensated for providing the first phone number to the mobile device.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:
   receiving a search request via a first of multiple demand partners;
   selecting an advertisement based on the search request;
   assigning a first telephone reference of a connection provider to an advertiser of the advertisement, the first assigned telephone reference to replace a previous separate telephone reference of the advertiser within the advertisement, and the first assigned telephone reference to further identify the first demand partner to provide the advertisement;
   providing the advertisement, including the first assigned telephone reference, to a mobile communication device via the first demand partner, to receive a telephone call at the connection provider from the mobile communication device via the assigned telephone reference;
   in response to a telephone call via the first assigned telephone reference, identifying the previous separate telephone reference of the advertiser and identifying the first demand source; and
   connecting the received telephone call to the separate telephone reference of the advertiser to track telephone connections to the advertiser established via calls to the first assigned telephone reference included in the advertisement provided via the first demand partner; and
   charging the advertiser a predetermined fee for the advertisement provided to the mobile communication device, in response to connecting the telephone call received by the connection provider at the first telephone reference provided in the advertisement, to the separate telephone reference of the advertiser.

2. The method of claim 1, further comprising providing the advertisement to the mobile communication device via a wireless media channel, wherein the media channel comprises one of the group consisting of:
   a web-based channel;
   a Wireless Application Protocol (WAP) channel;
   a custom client-server channel over a wireless communication link; and
   a Short Message Service (SMS) based channel.

3. The method of claim 2, further comprising:
   determining a location of a mobile device in response to the search request; selecting the advertisement according to the location of the mobile device for transmission to the mobile device via the wireless media channel.

4. The method of claim 3, further including determining the location of the mobile device by one of a group consisting of:
   an Automatic Number Identification (ANI) based location determination system;
   a Global Positioning System (GPS) receiver coupled to the mobile device; and
   a cellular communication system.

5. The method of claim 3, wherein the mobile device comprises a cellular phone;
   wherein the search request is received via Short Message Service (SMS) from the mobile device, the search request not including location information;
   wherein the determining of the location of the mobile device is in response to the search request received via SMS; and
   wherein the advertisement selected according to the location of the mobile device is provided to the mobile device via SMS in response to the search request.

6. The method of claim 1, wherein the telephone call connected to the advertiser is at least partially carried via Voice over Internet Protocol (VoIP).

7. The method of claim 1, wherein the receiving the search request further includes receiving the search request submitted from the mobile device.

8. The method of claim 1, wherein the assigned telephone reference comprises a local telephone number having a same area code as the separate telephone reference of the advertiser.

9. The method of claim 1, wherein the telephone reference comprises an extension unique to the advertiser among a plurality of advertisers.

10. A system, comprising: means for providing an advertisement for presentation, via a first of multiple demand partners, to a mobile device in response to the mobile device entering a commercial district, the advertisement to include at least a first reference assigned to the advertiser, the assigned reference being separate from a previous communication reference of the advertiser, and the first assigned reference to further identify the first demand partner to provide the advertisement;

means for establishing a telephonic connection with the mobile device via a user of the mobile device selecting the first assigned reference on the mobile device;

means for identifying the previous communication reference of the advertiser and the first demand partner, based on the first assigned reference used to establish the telephonic connection between the first party and the mobile device;

means for connecting the telephonic connection to the identified previous communication reference of the advertiser for real time communications between the user of the mobile device and the advertiser; and means for collecting a predetermined fee from the advertiser for the advertisement provided via the first demand partner, in response to a connection being established to the advertiser via connecting the telephonic connection to the advertiser.

11. A machine-readable medium having stored thereon a set of instructions which, when executed, perform a method comprising:

providing an advertisement for presentation to a mobile device, via a first of multiple demand partners, on behalf of an advertiser without a specific user request from the mobile device, the advertisement to include at least a first reference assigned to the advertiser, the first assigned reference being separate from a communication reference of the advertiser, and the first assigned reference to further identify the first demand partner to provide the advertisement;

establishing a telephonic connection with the mobile device via a user of the mobile device selecting the first assigned reference on the mobile device;

identifying the communication reference of the advertiser and the first demand partner, based on the first assigned reference used to establish the telephonic connection between the first party and the mobile device;

connecting the telephonic connection to the identified communication reference of the advertiser for real time communications between the user of the mobile device and the advertiser; and collecting a predetermined fee from the advertiser for the advertisement provided to the mobile device via the first demand partner, in response to a connection being established to the advertiser via connecting the telephonic connection to the advertiser.

12. A machine-readable medium having stored thereon a set of instructions which, when executed, perform a method comprising:

receiving a search request via a first of multiple demand partners;

selecting an advertisement based on the search request;

assigning a first telephone reference of a connection provider to an advertiser of the advertisement, the first assigned telephone reference to replace a previous separate telephone reference of the advertiser within the advertisement, and the first assigned telephone reference to further identify the first demand partner to provide the advertisement;

providing the first advertisement, including the first assigned telephone reference, to a mobile communication device via the first demand partner, to receive a telephone call at the connection provider from the mobile communication device via the assigned telephone reference;

in response to a telephone call via the first assigned telephone reference, identifying the previous separate telephone reference of the advertiser and identifying the first demand partner, and connecting the received telephone call to the separate telephone reference of the advertiser to track telephone connections to the advertiser established via calls to the first assigned telephone reference included in the advertisement provided via the first demand partner; and charging the advertiser a predetermined fee for the advertisement provided to the mobile communication device, in response to connecting the telephone call received by the connection provider at the first telephone reference provided in the advertisement, to the separate telephone reference of the advertiser.

13. The machine-readable medium of claim 12, further comprising providing the advertisement to the mobile communication device via a wireless media channel, wherein the media channel comprises one of the group consisting of:

a web-based channel;

a Wireless Application Protocol (WAP) channel;

a custom client-server channel over a wireless communication link; and a Short Message Service (SMS) based channel.

14. The machine-readable medium of claim 13, further comprising:

determining a location of a mobile device in response to the search request;

selecting the advertisement according to the location of the mobile device for transmission to the mobile device via the wireless media channel.

15. The machine-readable medium of claim 14, further including determining the location of the mobile device by one of a group consisting of:

an Automatic Number Identification (ANI) based location determination system;

a Global Positioning System (GPS) receiver coupled to the mobile device; and a cellular communication system.

16. The machine-readable medium of claim 14, wherein the mobile device comprises a cellular phone;

wherein the search request is received via Short Message Service (SMS) from the mobile device, the search request not including location information;

wherein the determining of the location of the mobile device is in response to the search request received via SMS; and wherein the advertisement selected according to the location of the mobile device is provided to the mobile device via SMS in response to the search request.

17. The machine-readable medium of claim 12, wherein the telephone call connected to the advertiser is at least partially carried via Voice over Internet Protocol (VoIP).

18. The machine-readable medium of claim 12, wherein the receiving the search request further includes receiving the search request submitted from the mobile device.

19. The machine-readable medium of claim 12, wherein the assigned telephone reference comprises a local telephone number having a same area code as the separate telephone reference of the advertiser.

20. The machine-readable medium of claim 12, wherein the telephone reference comprises an extension unique to the advertiser among a plurality of advertisers.

21. A system comprising:
a means for receiving a search request via a first of multiple demand partners;
a means for selecting an advertisement based on the search request;
a means for assigning a first telephone reference of a connection provider to an advertiser of the advertisement, the first assigned telephone reference to replace a previous separate telephone reference of the advertiser within the advertisement, and the first assigned telephone reference to further identify the first demand partner to provide the advertisement;
a means for providing the first advertisement, including the first assigned telephone reference, to a mobile communication device via the first demand partner, to receive a telephone call at the connection provider from the mobile communication device via the assigned telephone reference;
a means for identifying the previous separate telephone reference of the advertiser and identifying the first demand partner, in response to a telephone call via the first assigned telephone reference;
a means for connecting the received telephone call to the separate telephone reference of the advertiser to track telephone connections to the advertiser established via calls to the first assigned telephone reference included in the advertisement provided via the first demand partner; and
a means for charging the advertiser a predetermined fee for the advertisement provided to the mobile communication device, in response to connecting the telephone call received by the connection provider at the first telephone reference provided in the advertisement, to the separate telephone reference of the advertiser.

22. The system of claim 21, further comprising a means for providing the advertisement to the mobile communication device via a wireless media channel, wherein the media channel comprises one of the group consisting of:
a web-based channel;
a Wireless Application Protocol (WAP) channel;
a custom client-server channel over a wireless communication link; and
a Short Message Service (SMS) based channel.

23. The system of claim 22, further comprising:
a means for determining a location of a mobile device in response to the search request;
a means for selecting the advertisement according to the location of the mobile device for transmission to the mobile device via the wireless media channel.

24. The system of claim 23, wherein the means for determining the location of the mobile device further comprises at least one of a group consisting of:
an Automatic Number Identification (ANI) based location determination system;
a Global Positioning System (GPS) receiver coupled to the mobile device; and
a cellular communication system.

25. The system of claim 23, wherein the mobile device comprises a cellular phone and the system further comprises:
a means to receive the search request via Short Message Service (SMS) from the mobile device, the search request not including location information;
a means for determining of the location of the mobile device is in response to the search request received via SMS; and
a means for selecting the advertisement according to the location of the mobile device.

26. The system of claim 21, wherein the telephone call connected to the advertiser is at least partially carried via Voice over Internet Protocol (VoIP).

27. The system of claim 21, wherein the means for receiving the search request further includes a means for receiving the search request submitted from the mobile device.

28. A system comprising:
a unit to receive a search request via a first of multiple demand partners;
a unit to select an advertisement based on the search request;
a unit to assign a first telephone reference of a connection provider to an advertiser of the advertisement, the first assigned telephone reference to replace a previous separate telephone reference of the advertiser within the advertisement, and the first assigned telephone reference to further identify the first demand partner to provide the advertisement;
a unit to provide the first advertisement, including the first assigned telephone reference, to a mobile communication device via the first demand partner, to receive a telephone call at the connection provider from the mobile communication device via the assigned telephone reference;
a unit to identify the previous separate telephone reference of the advertiser and identifying the first demand partner, in response to a telephone call via the first assigned telephone reference;
a unit to connect the received telephone call to the separate telephone reference of the advertiser to track telephone connections to the advertiser established via calls to the first assigned telephone reference included in the advertisement provided via the first demand partner; and
a unit to charge the advertiser a predetermined fee for the advertisement provided to the mobile communication device, in response to connecting the telephone call received by the connection provider at the first telephone reference provided in the advertisement, to the separate telephone reference of the advertiser.

29. The system of claim 28, further comprising a unit to provide the advertisement to the mobile communication device via a wireless media channel, wherein the media channel comprises one of the group consisting of:
a web-based channel;
a Wireless Application Protocol (WAP) channel;
a custom client-server channel over a wireless communication link; and
a Short Message Service (SMS) based channel.

30. The system of claim 29, further comprising:
- a unit to determine a location of a mobile device in response to the search request;
- a unit to select the advertisement according to the location of the mobile device for transmission to the mobile device via the wireless media channel.

31. The system of claim 30, wherein the unit to determine the location of the mobile device further comprises at least one of a group consisting of:
- an Automatic Number Identification (ANI) based location determination system;
- a Global Positioning System (GPS) receiver coupled to the mobile device; and
- a cellular communication system.

32. The system of claim 30, wherein the mobile device comprises a cellular phone and the system further comprises:
- a unit to receive the search request via Short Message Service (SMS) from the mobile device, the search request not including location information;
- a unit to determine of the location of the mobile device is in response to the search request received via SMS; and
- a unit to select the advertisement according to the location of the mobile device.

33. The system of claim 28, wherein the telephone call connected to the advertiser is at least partially carried via Voice over Internet Protocol (VoIP).

34. The system of claim 28, wherein the unit to receive the search request further includes a unit to receive the search request submitted from the mobile device.

35. A method comprising:
- providing an advertisement for presentation to a mobile device, via a first of multiple demand partners, on behalf of an advertiser without a specific user request from the mobile device, the advertisement to include at least a first reference assigned to the advertiser, the first assigned reference being separate from a communication reference of the advertiser, and the first assigned reference to further identify the first demand partner to provide the advertisement;
- establishing a telephonic connection with the mobile device via a user of the mobile device selecting the first assigned reference on the mobile device;
- identifying the communication reference of the advertiser and the first demand partner, based on the first assigned reference used to establish the telephonic connection between the first party and the mobile device;
- connecting the telephonic connection to the identified communication reference of the advertiser for real time communications between the user of the mobile device and the advertiser; and
- collecting a predetermined fee from the advertiser for the advertisement provided to the mobile device via the first demand partner, in response to a connection being established to the advertiser via connecting the telephonic connection to the advertiser.

36. A method comprising:
- providing an advertisement for presentation, via a first of multiple demand partners, to a mobile device in response to the mobile device entering a commercial district, the advertisement to include at least a first reference assigned to the advertiser, the assigned reference being separate from a previous communication reference of the advertiser, and the first assigned reference to further identify the first demand partner to provide the advertisement;
- establishing a telephonic connection with the mobile device via a user of the mobile device selecting the first assigned reference on the mobile device;
- identifying the previous communication reference of the advertiser and the first demand partner, based on the first assigned reference used to establish the telephonic connection between the first party and the mobile device;
- connecting the telephonic connection to the identified previous communication reference of the advertiser for real time communications between the user of the mobile device and the advertiser; and
- collecting a predetermined fee from the advertiser for the advertisement provided via the first demand partner, in response to a connection being established to the advertiser via connecting the telephonic connection to the advertiser.

* * * * *